(12) United States Patent
Kandur Raja et al.

(10) Patent No.: US 10,116,850 B2
(45) Date of Patent: Oct. 30, 2018

(54) METHOD AND AN ELECTRONIC DEVICE FOR AUTOMATICALLY CHANGING SHAPE BASED ON AN EVENT

(71) Applicant: Samsung Electronics Co., Ltd., Gyeonggi-do (KR)

(72) Inventors: Barath Raj Kandur Raja, Bangalore (IN); Adarsha Ananda, Bangalore (IN); Ananya Padmanabha Suvarna, Mangalore (IN); Phani Avadooth Veera Venkata Rekapalli, Bangalore (IN); Jyothish Narayan, Bangalore (IN); Kumar Murugesan, Bangalore (IN); Magesh Krishnamurthy, Bangalore (IN); Periyasamy Paramasivam, Tamilnadu (IN); Rajath Basur Kumaraswamy, Bangalore (IN); Sushant Kathuria, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 27 days.

(21) Appl. No.: 14/593,416

(22) Filed: Jan. 9, 2015

(65) Prior Publication Data

US 2015/0195926 A1    Jul. 9, 2015

(30) Foreign Application Priority Data

Jan. 9, 2014    (IN) .............................. 115/CHE/2014

(51) Int. Cl.
*H04N 5/225*    (2006.01)
*G06F 1/16*    (2006.01)
*H04N 5/232*    (2006.01)

(52) U.S. Cl.
CPC .......... *H04N 5/2258* (2013.01); *G06F 1/1605* (2013.01); *G06F 1/1656* (2013.01); *H04N 5/23238* (2013.01)

(58) Field of Classification Search
CPC ............. H04N 5/2258; H04N 5/23238; H04N 13/0239; H04N 13/0242; H04N 13/025; H04N 13/0282; G06F 1/1652
See application file for complete search history.

(56) References Cited

U.S. PATENT DOCUMENTS

| | | | |
|---|---|---|---|
| 2011/0043669 A1* | 2/2011 | Ishida | H04N 5/23238 348/264 |
| 2011/0069189 A1* | 3/2011 | Venkataraman | H01L 27/14618 348/218.1 |
| 2011/0241998 A1* | 10/2011 | McKinney | G06F 1/1616 345/168 |
| 2012/0002096 A1* | 1/2012 | Choi | H04N 5/2253 348/335 |
| 2012/0154288 A1* | 6/2012 | Walker | G06F 1/1616 345/169 |
| 2013/0010405 A1* | 1/2013 | Rothkopf | H04M 1/0216 361/679.01 |

(Continued)

*Primary Examiner* — Paul Berardesca
(74) *Attorney, Agent, or Firm* — The Farrell Law Firm, P.C.

(57) ABSTRACT

A method and an apparatus for automatically changing a shape of an electronic device are provided. The method includes identifying, by the electronic device, at least one event triggered in the electronic device; and changing, by the electronic device, the shape of the electronic device according to the at least one identified event.

20 Claims, 36 Drawing Sheets

(56) References Cited

U.S. PATENT DOCUMENTS

| | | | | |
|---|---|---|---|---|
| 2013/0037228 A1* | 2/2013 | Verschoor | ............ | G06F 1/1652 |
| | | | | 160/377 |
| 2013/0197819 A1* | 8/2013 | Vanska | ................ | H04M 19/04 |
| | | | | 702/33 |
| 2013/0342090 A1* | 12/2013 | Ahn | ......................... | G09F 9/33 |
| | | | | 312/258 |
| 2014/0101578 A1* | 4/2014 | Kwak | .................... | G06F 3/017 |
| | | | | 715/761 |
| 2014/0226266 A1* | 8/2014 | Kang | ................ | H01L 51/0097 |
| | | | | 361/679.01 |
| 2014/0285476 A1* | 9/2014 | Cho | ..................... | G06F 1/1601 |
| | | | | 345/204 |
| 2014/0314976 A1* | 10/2014 | Niiyama | .............. | F15B 15/103 |
| | | | | 428/34.3 |
| 2015/0205417 A1* | 7/2015 | Yairi | ...................... | G06F 3/046 |
| | | | | 345/173 |

* cited by examiner

Rear view

Front view

METHOD AND AN ELECTRONIC DEVICE FOR AUTOMATICALLY CHANGING SHAPE BASED ON AN EVENT

PRIORITY

This application claims priority under 35 U.S.C. § 119(a) to an Indian Patent Application Serial No. 115/CHE/2014 filed on Jan. 9, 2014 in the Indian Patent Office, the entire content of which is incorporated herein by reference.

BACKGROUND OF THE INVENTION

1. Field of the Invention

The present invention relates generally to electronic devices, and more particularly, to a mechanism for automatically changing shapes of a flexible electronic device based on an event in the flexible electronic device.

2. Description of the Related Art

Due to the proliferation of flexible electronics, electronic devices have been provided with increasingly improved designs and user interfaces that significantly improve the overall user experience with the electronic devices. Flexible electronic devices allow the user to change shapes and user interfaces of the electronic device by bending, rolling, twisting, squeezing, folding, etc., in different angles and planes.

Different methods and systems have been proposed to change the shape of flexible electronic devices. In one such mechanism, user may manually change the shape of the electronic device by bending the electronic device in a particular way while performing a particular operation. For example, the user may bend the electronic device in a 'V' shape while performing a call function, bend in 'L' shape while composing a message, etc. In the above-described methods and systems, the user must manually change the desired shape of the electronic device, which is a tedious task. In another mechanism, flexible display technologies are used to flex electronic devices displays. The user may bend the display device into various shapes, such as to change the user interface pursuant to the user requirements. However, electronic devices with flexible displays are commonly provided with rigid housing structures or other structures that form a rigid electronic device. Further, such rigid electronic devices may be vulnerable to damage caused by an impact, such as from dropping the device on a hard surface.

Generally, the shape of the electronic device while performing operations may not be so attractive and may be unclear to the user. For example, in some electronic devices, when transferring contents from one device to another, during an alarm event, a screen timeout, or other timer-based events, etc., the shape of the device remains same. Some electronic devices provide a mechanism for changing the shape of the electronic device based on a user input. For example, when the user selects a gaming application in order to display a gaming console, the shape of the electronic device may change to a predefined shape in order to provide the user with a better user interface and easier access to the game controls. Further, while performing a particular operation, shapes that are better suited to perform the operation can be provided in real-time, even though the same operation can also be performed with other shapes. For example, while taking pictures, the capabilities of two cameras in the electronic device can be used to their complete extent by using different shapes.

Further, many such mechanisms for changing a shape of an electronic device use a shape changing materials such as, shape memory alloys, Dielectric Electro Active Polymers (DEAPs), temperature responsive polymers, piezoelectric materials, etc., to control the changes in shape of the electronic device. Though the use of such materials is effective to a certain degree for controlling the shape of the electronic device, these materials have their own respective advantages and disadvantages in terms of response time, structural fatigue (which may lead to a reduction in the number of times shapes can be changed), rigidity, the number of times the shape can be changed during the lifetime of the electronic device, etc. Therefore, there is a need of a robust system and method for automatically controlling shapes of the electronic device.

SUMMARY OF THE INVENTION

The present invention has been made to address at least the above-mentioned problems and/or disadvantages and to provide at least the advantages described below. Accordingly, an aspect of the present invention is to provide a system and method for automatically controlling shape of an electronic device based on an event in the electronic device.

Another aspect of the present invention is to provide a system and method for automatically changing shape of an electronic device according to at least one determined shape for an event in the electronic device.

Another aspect of the present invention is to provide a system and methods to use capabilities of an electronic device to its complete extent by using different shapes in real-time.

According to an aspect of the invention, a method for automatically changing shape of an electronic device is provided. The method includes identifying, by the electronic device, at least one event triggered in the electronic device; and changing, by the electronic device, the shape of the electronic device according to the at least one identified event.

According to an aspect of the invention, an electronic device is provided. The electronic device includes a sensing module; a shape control module; and a control module configured to: control the sending module to identify at least one event triggered in the electronic device using the sensing module, and control the shape control module to change a shape of the electronic device according to the at least one identified event.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
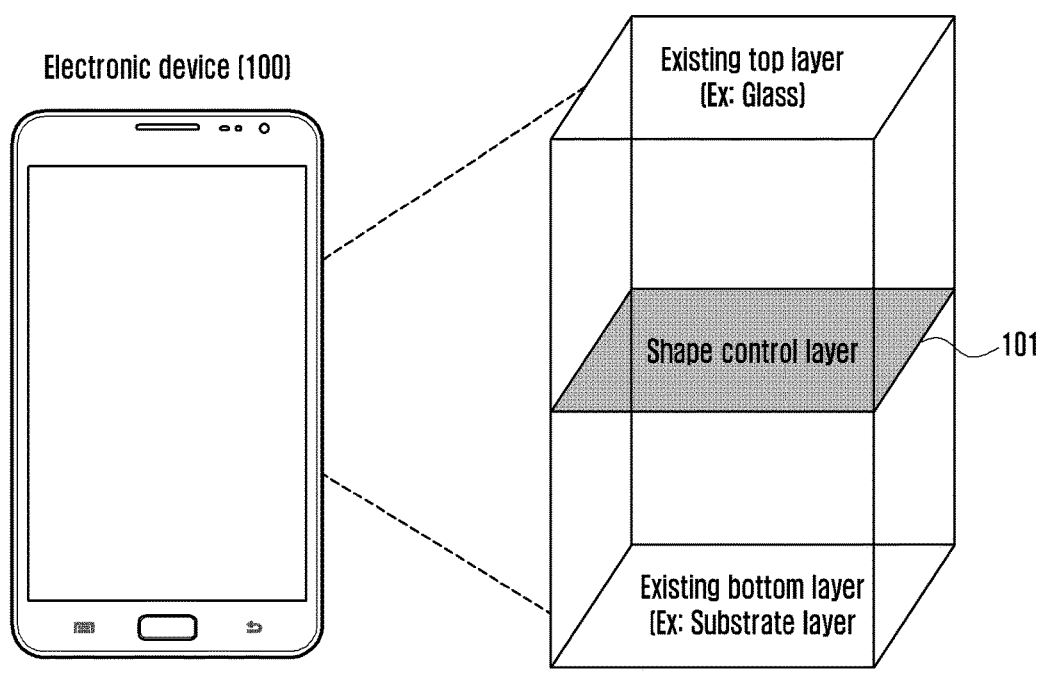
FIG. 1 is a diagram illustrating a high level architecture of an electronic device, according to an embodiment of the present invention.

Various embodiments of the present invention are described herein with reference to the accompanying drawings. Descriptions of well-known components and processing techniques may be omitted so as to not unnecessarily obscure the subject matter of the present invention. In the following description, similar reference characters may be used to denote similar corresponding features throughout the drawings.

Herein, the term "event" refers to instantiation of a property or operation in an electronic device in response to an internal or external notable occurrence at any given instant. Each event may be associated with specific operation to be performed in the electronic device.

Herein, the term "first shape" refers to a primary shape of the electronic device before changing to a second shape.

Herein, the term "second shape" refers to a shape of the electronic device after changing its shape from the first shape. In certain embodiments of the present invention, the second shape can be the same as the first shape of the electronic device, such as when the electronic device is configured to continuously change the shape according to an event. Further, the labels first and second are used for illustrative purposes, and do not limit the scope of the present invention.

Herein, the term "electronic device" refers to any electronic device may be provided with flexible internal and external components that allow the device to be flexible. The flexible components may include a flexible display, flexible batteries, flexible circuit boards, flexible housing, and other flexible electrical or support components. Examples of an electronic device can include, but are not limited to, a mobile phone, a laptop, a display, a personal digital assistant, a portable electronic device, a communicator, etc.

Throughout the detailed description, the terms "chameleon event" and "camera event" are used interchangeably.

Throughout the detailed description, the terms "electronic device" and "flexible electronic device" and "device" are used interchangeably.

Throughout the detailed description, the terms "first shape" and "current shape" are used interchangeably.

According to certain embodiments of the present invention, an electronic device is capable of automatically changing its shape based an event. The electronic device includes a shape control layer on substrate of the device for changing the shape of the device. The shape control layer includes actuators which may project the surface associated with the second shape. Upon identifying triggering of an event in the electronic device, the electronic device identifies the event triggered in the electronic device and determines a second shape associated with the identified event. The current shape of the electronic device can be automatically changed to the second shape. According to an embodiment of the present invention, the event of the electronic device is identified based on an internal input from the device or an external input received by the device.

According to an embodiment of the present invention, the electronic device is a mobile phone, a smart phone, a Personal Digital Assistant (PDA), a tablet, a media player, or any other electronic device.

According to an embodiment of the present invention, a system and method that are robust, simple, agnostic, and effective for automatically changing the shape of the electronic device based on an event in the electronic device are provided. The event can be an internal event or an external event. An internal event can be automatically triggered within the device. Internal events can include, but are not limited to, usage pattern events and other context events. For example, according to an embodiment of the present invention, when an incoming call is received, an internal event is triggered and the electronic device changes its shape accordingly. The change in shape may be pre-configured by the user. External events can include, but are not limited to, sensing events, which can include, but are not limited to, detection of events based on user gestures, and user input and sensing of other external events. For example, a user's voice or a pre-defined audio input can be considered as an external event. A sensor on the electronic device may recognize the audio input and the electronic device can change its shape automatically based on the audio input. In another example, when the electronic device identifies a gesture like a pattern around bend points, an external event is triggered and the electronic device changes its shape accordingly. The change in shape can be associated with the pattern crated by user.

The change in shape can assist the user in performing a specific operation. For example, while attending a call, the electronic device can be configured to change the shape and become more curved around the user's ear in case of a noisy environment. This change in shape results in cancelling the ambient noise in the surrounding and improving the sound quality of the speaker in the electronic device. A sensor present on the electronic device can measure ambient noise.

The use of a shape control layer for continuously changing the shape of the electronic device allows the shape resolution of the device to be changed instantly. According to an embodiment of the present invention, the shape of the electronic device is projected using Micro Electrical Mechanical System (MEMS) based balloon actuators. Electromagnets present in the shape control layer balance the shape of the electronic device, and a strength of a magnetic field between the electromagnets maintains the changed shape. Upon releasing the magnetic field, the electronic device can quickly change its shape back to the original form (i.e., a first shape). As the change in shape is performed at the substrate level without external device, the shape control layer can easily switch between multiple shapes based on the event of the electronic device. According to certain embodiments of the present invention, the shape control layer does not suffer from structural fatigue.

According to an embodiment of the present invention, an electronic device can automatically change its shape based on the event sensed. At least one sensor on the electronic allows various user input and user gestures to be captured and processed. Upon detecting a gesture from the user, the electronic device can identify an event and automatically change the shape of the device. For example, when the user selects a message application, the electronic device can change its shape to a second shape to allow the message to be easily typed.

According to an embodiment of the present invention, an electronic device can be a rolled up into a column shape when not in use. Upon detection of an event associated with an operation the device can automatically change its shape. For example, at night the user may set an alarm. The electronic device is rolled into a column upon detecting a lack of user activity for a long duration. The electronic device may change from the rolled up column shape into a second shape when the alarm rings.

According to an embodiment of the present invention, an electronic device placed on a table can indicate the progress level of operation being performed. The electronic device can shift between multiple second shapes, where each second shape is associated with a certain level of progress. For example, based on the shape of the electronic device placed on the table, the user may identify the progress level of a download.

The user may pre-configure multiple second shapes according to the user's preferences and requirements. The electronic device allows users to select patterns that can be converted to second shapes, as required by the user. According to an embodiment of the present invention, pre-configured second shape may be stored. For example, second shapes for different events can be stored in advance in a database, and the second shapes may be determined based on the event from the database.

According to an embodiment of the present invention, a change in the shape of the electronic device allows a plurality of cameras in the electronic device to be at different positions with respect to the change in shape. This allows the plurality of cameras to capture areas in a horizontal view (e.g., landscape view) or a vertical view (e.g., portrait view) in the field of view of each camera.

FIG. 1 is a diagram illustrating a high level architecture of an electronic device, according to an embodiment of the present invention. Referring to FIG. 1, an electronic device 100 includes a shape control layer 101 fabricated between an existing bottom layer (e.g., a substrate) and an existing top layer (e.g., glass). The shape control layer 101 contains at least one actuator, which can project a surface for changing the shape of the electronic device 100. At least one electromagnet placed between the actuators is configured to balance the shape of the projected surface and create a magnetic field to maintain the changed shape of the electronic device 100.

Figure 2:
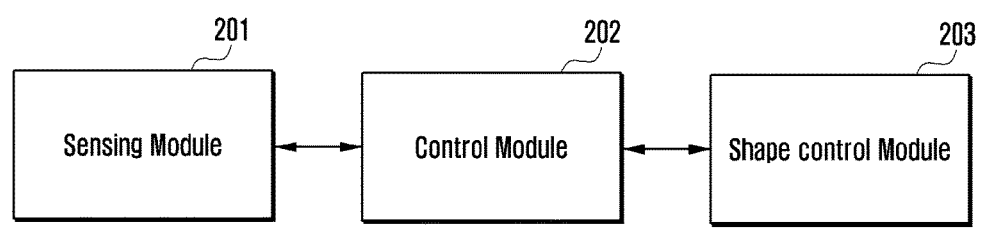
FIG. 2 is a block diagram illustrating different modules in the electronic device, according to an embodiment of the present invention.

FIG. 2 is a diagram illustrating a block diagram showing different modules in an electronic device, according to an embodiment of the present invention. Referring to FIGS. 1 and 2, an electronic device 100 further includes a sensing module 201, a control module 202 and a shape control module 203. The sensing module 201 is configured to sense an event. According to an embodiment of the present invention, the sensing module includes, but is not limited to, a temperature sensor, a proximity sensor, a humidity sensor, a pressure sensor, a tactile sensor, a finger print sensor, an image sensor, an acoustic sensor, a touch sensor, a dynamic vision sensor, or any other sensing module for sensing the event. For example, the event can be an external event, such as receiving a notification in the electronic device 100. The sensing module 201 is configured to sense the event and send the sensed event to the control module 202. The tactile sensor is configured to determine pressure applied while holding the electronic device 100.

The pressure sensor is configured to measure the atmospheric pressure and ambient conditions. The humidity sensor is configured to measure the humidity in the atmosphere and identify user gesture like air blown from the mouth of the user.

The control module 202 is configured to identify an event of the electronic device 100 and the current (i.e., a first) shape of the electronic device 100. According to an embodiment of the present invention, the event of the electronic device 100 can be identified once an event is triggered using an internal event or an external event. Internal events are related to device related events obtained by the electronic device automatically and external events are obtained through the sensing module 201. The control module 202 is configured to determine at least one second shape associated with the identified event. The control module 202 is configured to send the determined at least one second shape to shape control module 203 and provide inputs required for automatically changing the first shape of the electronic device 100 into a second shape. The shape control module 203 is configured to control the shape control layer 101 of the electronic device 100. The shape control module 203 is configured to identify the required inflation strength for the actuators to project a surface based on the determined second shape. The shape control module 203 is configured to control electromagnets in the shape control layer 101 electrically and modify the strength of a magnetic field created by the electromagnets to balance the projected surface and maintain the second shape of the electronic device 100.

Figure 3:
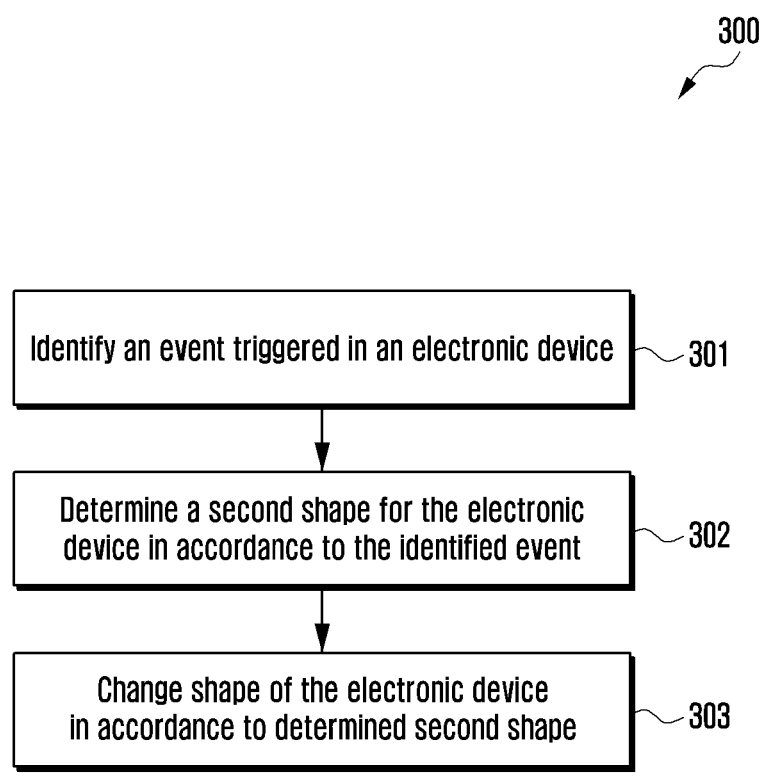
FIG. 3 is a flowchart illustrating a process for automatically changing shape of the electronic device, according to an embodiment of the present invention.

FIG. 3 is a flowchart illustrating a process for automatically changing shape of the electronic device, according to an embodiment of the present invention.

Referring to FIG. 3, at step 301, the electronic device 100 identifies an event triggered in an electronic device 100. The event in the electronic device 100 can be triggered based on an internal event or an external event. External events include, but are not limited to, a user input such as gesture, blown air, a user selection, etc. For example, a sensing module can be configured to identify a thumb gesture performed by the user. Upon capturing the thumb gesture, the controller module 202 identifies the shape associated with the thumb gesture. In another example, when a notification is received in the electronic device 100 then the sensing module 201 can be configured to sense the notification and send the sensed event to the controller module 202.

At step 302, electronic device 100 determines a second shape of the electronic device 100 based on the identified event. According to an embodiment of the present invention, an event in the electronic device 100 can be associated with one or more second shapes. The sensing module 201 identifies the event and the current shape of the electronic device 100. The control module 202 determines the second shape of the electronic device 100 based on the event sensed by the sensing module 201. For example, this type of event can be associated with the electronic device 100 being kept inside a shirt pocket of the user. Upon receiving a call, the electronic device 100 determines the second shape, and rolls up into the determined second shape.

At step 303, the electronic device changes its shape according to the determined second shape. According to an embodiment of the present invention, the shape control module 203 can be configured to apply an inflation strength to project a surface in a first shape of the electronic device 100. The shape control module 203 applies the inflation strength to the actuators present in the shape control layer 101. According to an embodiment of the present invention, balloon actuators present in the shape control layer 100 are inflated based on the applied inflation strength. The various actions in flow chart 300 may be performed in the order presented, in a different order, or simultaneously. Further, in some embodiments of the present invention, some actions listed in FIG. 3 may be omitted.

According to an embodiment of the present invention, the user pre-configures the second shape based on the triggered event in the electronic device 100.

Figure 4:
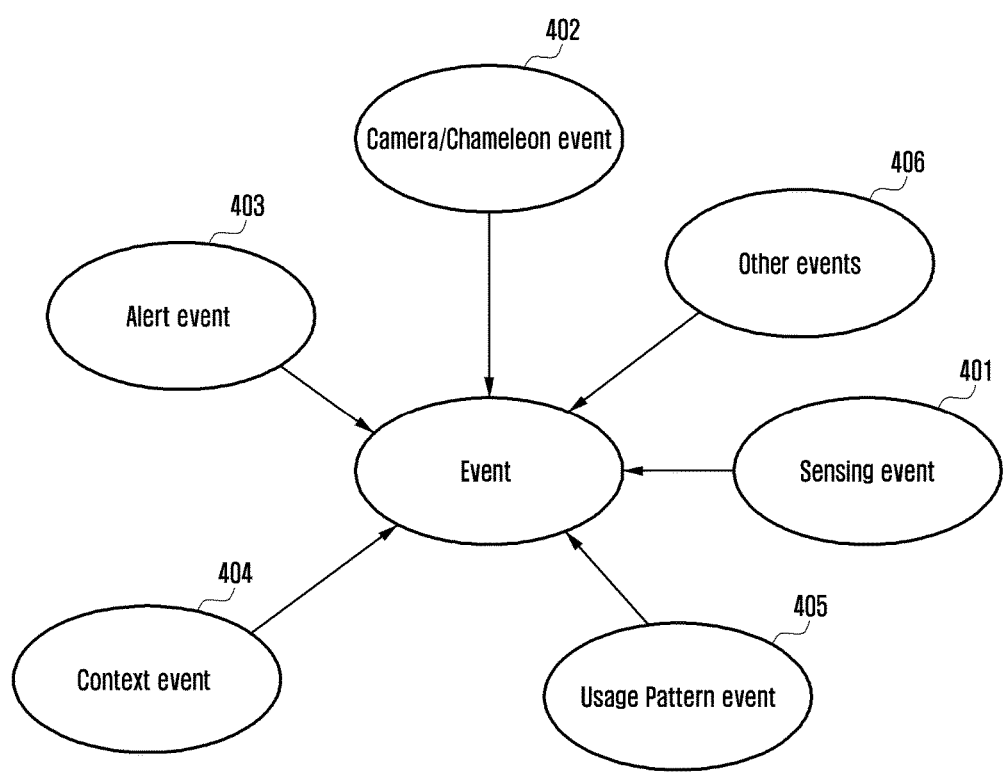
FIG. 4 is a diagram illustrating an example of multiple events of the electronic device, according to an embodiment of the present invention.

FIG. 4 is a diagram illustrating an example of multiple events of the electronic device, according to an embodiment of the present invention.

Referring to FIG. 4, various events according to an embodiment of the present invention include a sensing event 401, a camera event 402, an alert event 403, a context event 404, a usage pattern event 405, and other events 406. According to an embodiment of the present invention, other events 406 can be related to, for example, a timer or progress of an operation performed in the electronic device 100.

Each event is associated with a change in shape of the electronic device 100. The sensing module 201 senses internal and external events in the electronic device 100. Each event is associated with an operation being performed in the electronic device 100. Examples of such operations include progress completion level and a process related to the operation being performed. An example of an automatic change in the shape of the electronic device 100 based on an identified event is described herein with reference to FIGS. 19A and 19B.

The camera/chameleon event 402 refers to an operation related to at least one camera present in the electronic device. According to an embodiment of the present invention, the change in the shape of the electronic device 100 arranges cameras present on the electronic device 100 to positions along one side of the electronic device 100. This change from the first shape to the second shape associated with the camera event allows capturing of images present in the field of view of each camera at the same time. According to an embodiment of the present invention, the field of view of each camera can be different and include different areas to be captured. The captured images can be stitched together to form a single image of plurality of areas. The captured image can be a panoramic image. An example of an automatic change in shape of the electronic device based on the chameleon event is described herein with reference to FIGS. 11 to 14.

According to an embodiment of the present invention, the sensing event 401 captures at least one gesture performed by the user and changes the shape of the electronic device 100. One or more sensing modules 201 in the electronic device 100 can be configured to sense ambient conditions like noise, brightness, and reflection control. The electronic device 100 automatically changes its shape to the second shape to assist user with the ambient conditions. For example, if a display of the electronic device has a mirror-like screen, the display can receive a lot of reflection from all directions, leading to eyestrain. In conventional devices, the brightness level of the display device is increased to combat this reflection. Increasing the brightness consumes additional battery power. When a large amount of reflection on the display is detected, the electronic device 100 changes to the second shape, in order to minimize reflection and improve readability.

The sensing module 201 present on the electronic device 100 may include, but is not limited to, a temperature sensor, a tactile sensor, a humidity sensor, a pressure sensor, a fingerprint sensor, an image sensor, an acoustic sensor, a proximity sensor, a touch sensor, a Dynamic Vision Sensor (DVS), a biometric sensor, a proximity sensor, etc. For example, biometric sensors can be configured to capture physiological and behavioral characteristics of the user. The physiological characteristics can include fingerprint, face recognition, DeoxyriboNucleic Acid (DNA), a palm print, hand geometry, iris recognition, retina recognition, and an odor/scent. Behavioral characteristics are related to a pattern of behavior of a person, including, but not limited to, rhythm, gait, and voice. The electronic device 100 can be configured to change its shape on detection of a user characteristic at the biometric sensor. An example of an automatic change in shape of the electronic device 100 based on sensing events is described herein with reference to FIGS. 16A to 16E. The tactile sensor is configured to determine pressure applied while holding the device. The pressure sensor is configured to measure the atmospheric pressure and ambient conditions. The humidity sensor is configured to measure the humidity in the atmosphere and identify user gestures, such air blown from the mouth of the user.

According to an embodiment of the present invention, the alert event 402 refers to a notification received in the electronic device 100. The notifications can be, for example, application notifications, network notifications or reminders, or alarm and schedule notifications configured in a calendar application. For example, the electronic device 100 can be configured to change its shape to indicate the presence of a wireless network in a particular location. Upon receiving an alert, the electronic device 100 is configured to display the notification in the second shape of the electronic device. An example of the automatic change in shape of the electronic device based on alert event 404 is described herein with reference to FIG. 20.

In the context event 404, the electronic device 100 changes its shape based on contexts such as a device context, an application context, a user context, and a sensor context. Examples of device contexts include, but are not limited to, location, date, time, and Global Positioning Satellite (GPS) location of the electronic device 100. For example, in the context event the electronic device 100 can change its shape to indicate directions like right left, while using the GPS application. An example of the automatic change in shape of the electronic device 100 based on context event is described herein with reference to FIG. 18. Examples of application contexts include, but are not limited to, composing messages, receiving calls, watching video, and receiving calendar events and/or application content. For example, in an application context event, the electronic device 100 can change its shape while watching a video. According to an embodiment of the present invention, the electronic device 100 changes its shape in accordance with a physical exercise routine. For example, the electronic device 100 changes its shape based on a physical exercise application. The electronic device 100 can be configured to twist to left or right or bend. The user can view the change in shape and perform the physical exercise.

The usage pattern event 405 changes the shape of the electronic device 100 based on user preferences and previous shapes of the electronic device 100. For example, when a usage pattern event 405 for the user handling the electronic device is associated with face recognition, based on the face recognition the electronic device 100 can be configured to identify the frequently preferred shapes for the identified user.

The usage pattern event 405 stores user related information and preferences. The usage pattern event 405 identifies the shape-changes by the device 100 and user-configured second shapes. For example, when a usage pattern event 405 for the user handling the electronic device 100 is associated with iris recognition, based on the retina recognition, the device 100 may identify the frequently preferred shapes for the identified user. In another example, if the user prefers the phone to be in an L shape while composing a message, this L shape along with the composing operation defines the usage pattern for the user.

Figure 5:
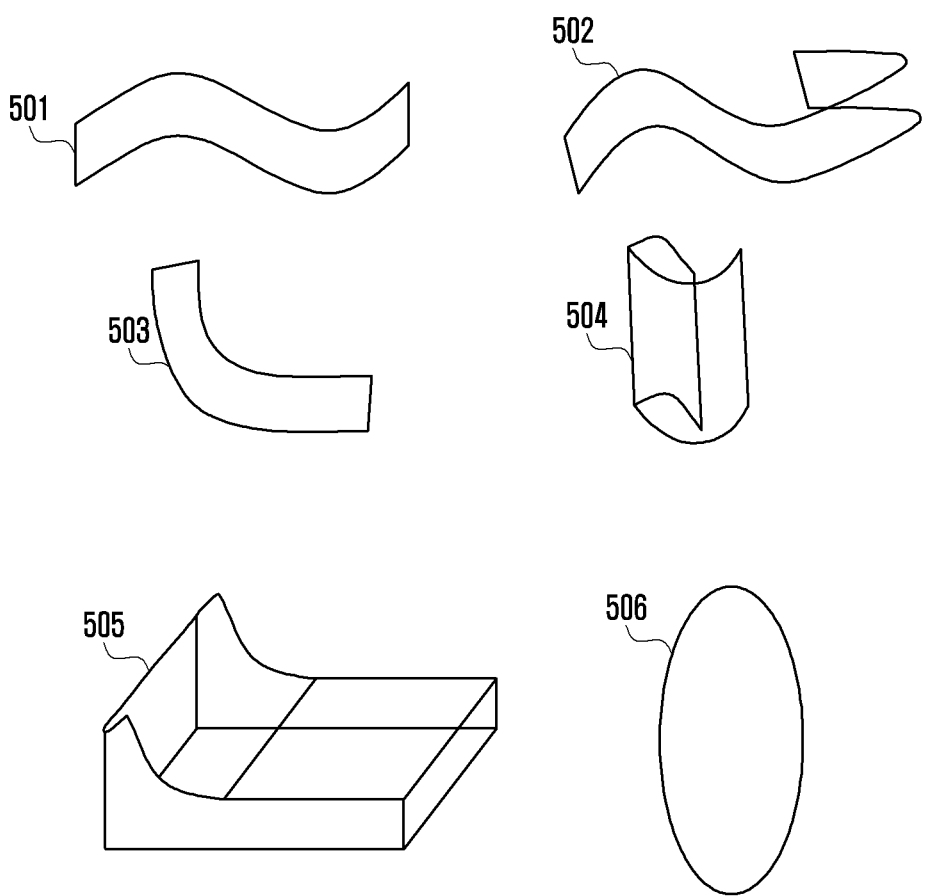
FIG. 5 is a diagram illustrating examples of different shapes of the electronic device, according to an embodiment of the present invention.

FIG. 5 is a diagram illustrating examples of different shapes of an electronic device, according to an embodiment of the present invention.

Referring to FIG. 5, shapes 501 and 502 are examples of second shapes of the electronic device 100. For example, if user performs a touch gesture on a pattern present on the display of the electronic device 100, this touch gesture in the pattern changes the shape of the electronic device 100 depicted in 501. The electronic device 100 can be configured to change from the first shape to the second shape based on the pattern performed by the user as shown in 502. Shape 503 is an example of an 'L' second shape. The electronic device 100 can be configured to change to this 'L' second shape 503 in order to assist the user while composing a message. Shape 504 is a rolled up shape of the electronic device 100. For example, when the electronic device 100 is kept in the pocket of the user, the electronic device 100 can be configured to determine the second shape and change to the second shape as shown in 504. When in the rolled-up shape 504, the electronic device 100 is compact and easier for the user to carry around. Shape 505 of the electronic device 100 is a virtual docking station. Shape 506 can be obtained by user input or though an alert event 402.

Figure 6:
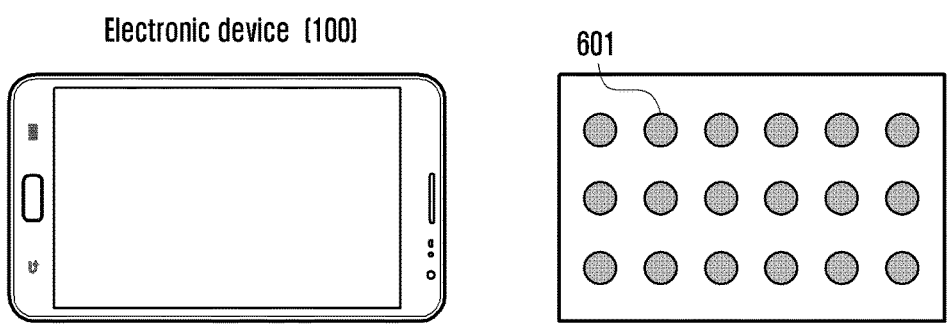
FIG. 6 is a diagram illustrating a top view of actuators present in a shape control layer, according to an embodiment of the present invention.

FIG. 6 is a diagram illustrating a top view of balloon actuators present in a shape control layer 101, according to an embodiment of the present invention.

Referring to FIG. 6, a plurality of balloon actuators are placed in a matrix format. One actuator (not shown) is placed beneath every balloon 601 and can be controlled independently. The curvatures of the surface projected during shape changing can be created based on the flexibility of the balloon 601 and the ability of the balloon 601 to inflate in an elongated fashion in vertical direction. To obtain a various and exquisite second shape, number of actuators packed in a unit surface area is increased. According to an embodiment of the present invention, a Micro Electrical Mechanical Systems (MEMS) based balloon actuator may be used for projecting the surface associated with the second shape. The MEMS based balloon actuator can be integrated in the shape control layer 101 of the electronic device 100, due to its small size and quick response time.

Figure 7:
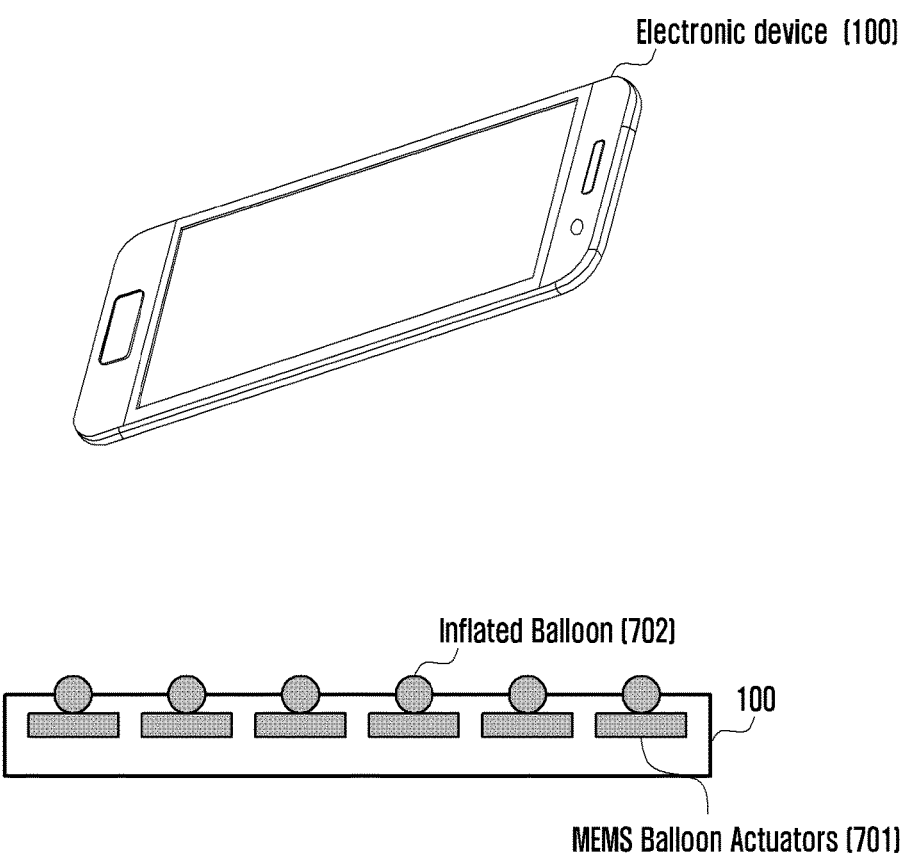
FIG. 7 is a diagram illustrating a side view of the shape control layer of FIG. 6, according to an embodiment of the present invention.

FIG. 7 is a diagram illustrating a side view of the shape control layer of FIG. 6, according to an embodiment of the present invention. FIG. 7 shows the MEMS balloon actuators 701 along with an inflated balloon 702. The actuators 701 inflate the balloons 601 to project a surface for changing shape of the electronic device 100. Upon receiving an electrical signal the actuator 701 inflates the balloons 601 to project the surface associated with the determined second shape.

Figure 8A:
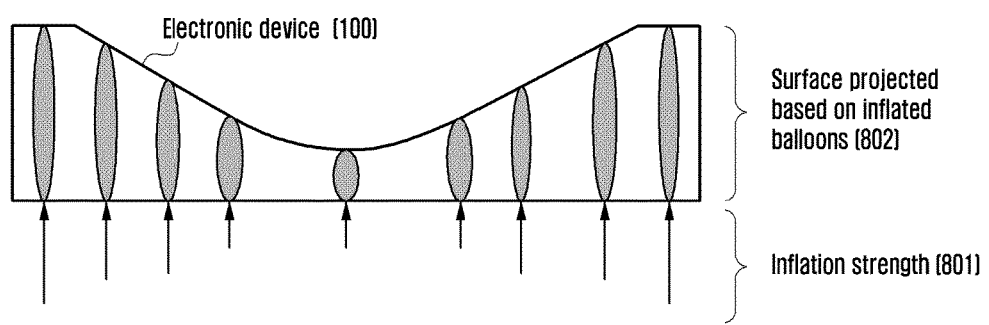
FIGS. 8A and 8B are diagrams illustrating examples of actuators projecting a surface, according to an embodiment of the present invention.
Figure 8B:
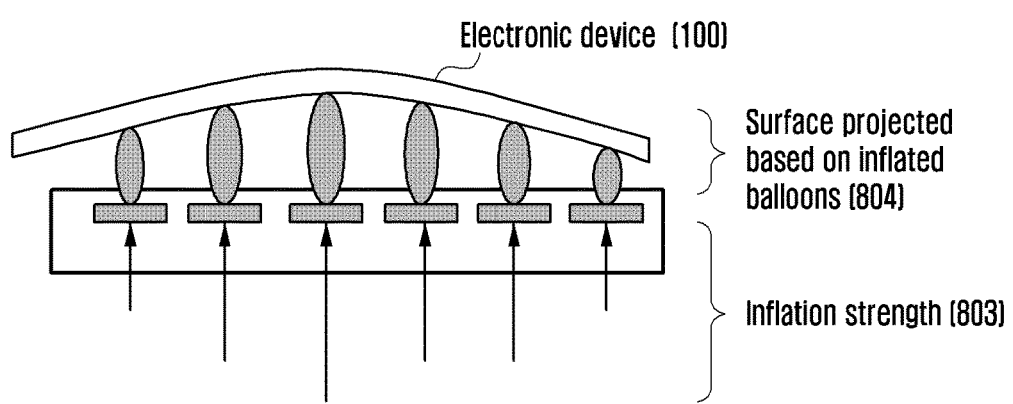

FIGS. 8A and 8B are diagrams illustrating an example of actuators projecting surface, according to an embodiment of the present invention. FIG. 8A shows a projected surface 802 of the electronic device 100. Each actuator 701 present in the shape control layer 101 is applied a different inflation strength 801 (the arrow length in FIG. 8A indicates the inflation strength for each balloon). Based on the inflation strength 801 applied by the actuator 701 to the attached balloon, the surface 802 is projected as shown in FIG. 8A. The final shape of the electronic device 100, as shown in shape 501, shape 502, and shape 503 illustrated in FIG. 5 can be obtained by projecting the surface 802.

FIG. 8B is a diagram illustrating a projected surface 804 of the electronic device 100. Each actuator 701 present in the shape control layer 101 is applied with a different inflation strength 803 (the arrow length in FIG. 8B corresponds to the inflation strength for each balloon). Based on the inflation strength 803 applied by the actuator 701 to the attached balloon, the surface 804 shown in FIG. 8B can be projected. FIG. 8B shows a convex shape of the electronic device 100 as the inflation strength applied in left and right regions of the electronic device 100 are less compared to the middle region.

Figure 9:
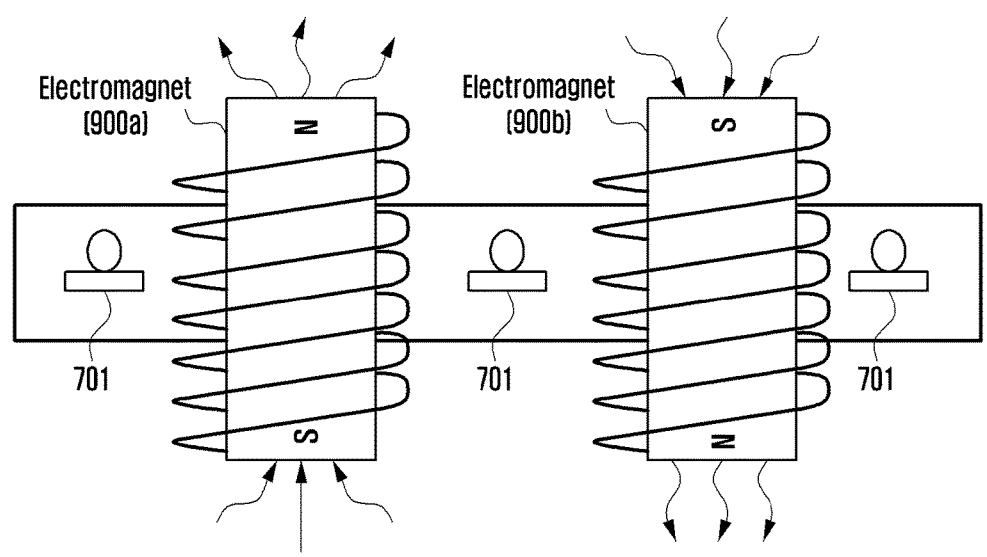
FIG. 9 is a diagram illustrating an example of electromagnets present in a shape control layer, according to an embodiment of the present invention.

FIG. 9 is a diagram illustrating an example of electromagnets present in a shape control layer of an electronic device, according to an embodiment of the present invention.

Referring to FIG. 9, a plurality of electro magnets 900*a* and 900*b* placed between the actuators 701 are configured to control and balance the shape of the projected surface. The magnetic field strength of the electromagnets 900*a* and 900*b* can be controlled to balance the projected surface and create complex second shapes with higher shape resolution.

Figure 10A:
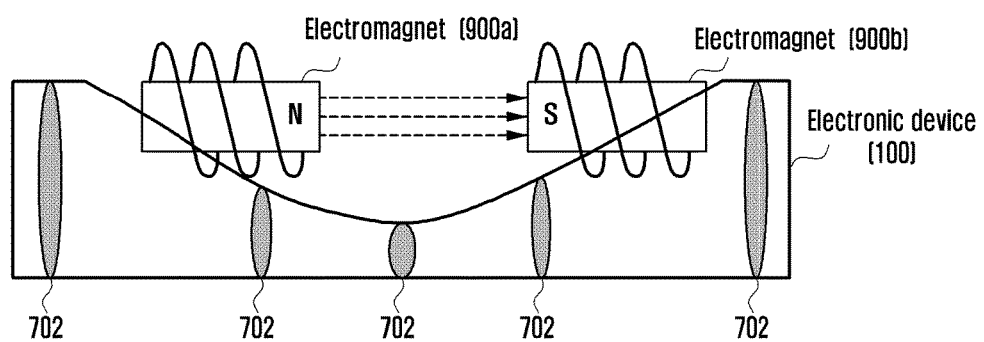
FIGS. 10A and 10B are diagrams illustrating examples of balancing a shape of an electronic device, according to an embodiment of the present invention.
Figure 10B:
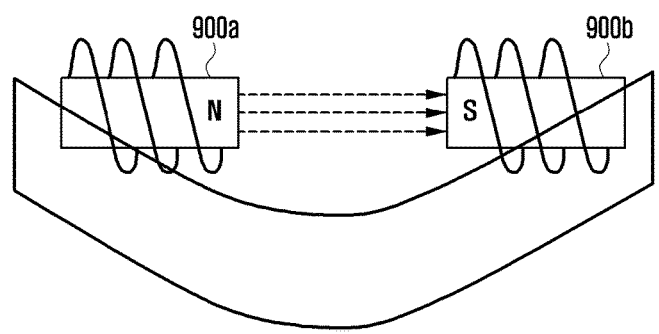

FIGS. 10A and 10B are diagrams illustrating examples of balancing the shape of an electronic device, according to an embodiment of the present invention. When a magnetic field is generated between the electromagnets 900*a* and 900*b*, the actuators 701 release the inflated balloons 702, as shown in FIG. 10B. Due to the strength of the magnetic field between the electromagnets the second shape of the electronic device 100 is maintained. According to an embodiment of the present invention, the electromagnets are activated such that the opposite poles of the electromagnets face each other.

Figure 11A:
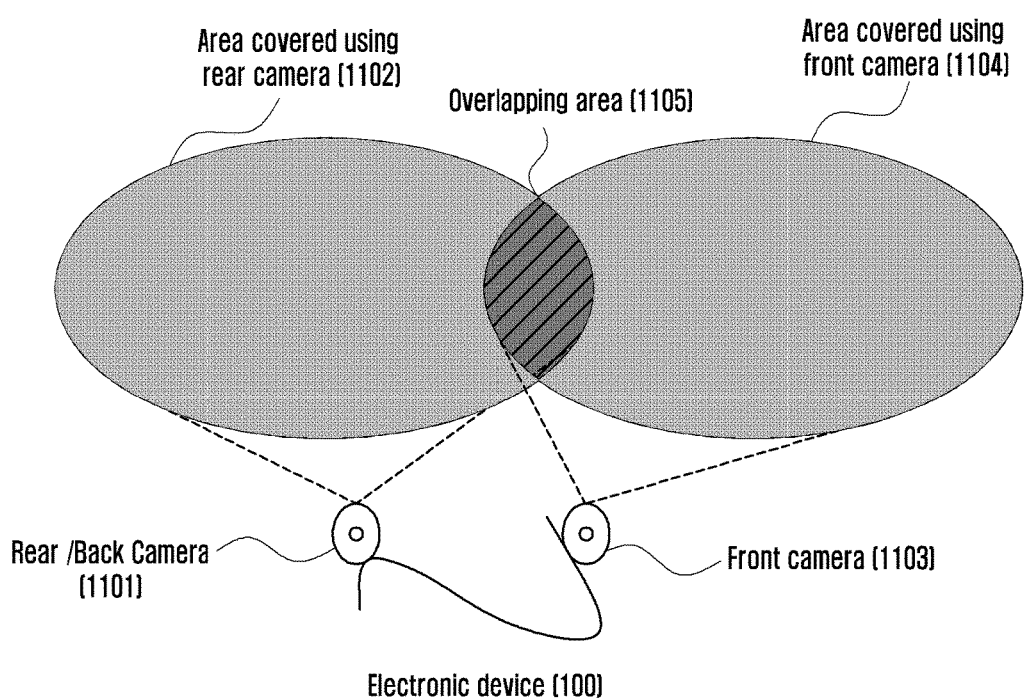
FIGS. 11A and 11B are diagrams illustrating examples of an event indicating camera/chameleon event in an electronic device, according to an embodiment of the present invention.
Figure 11B:
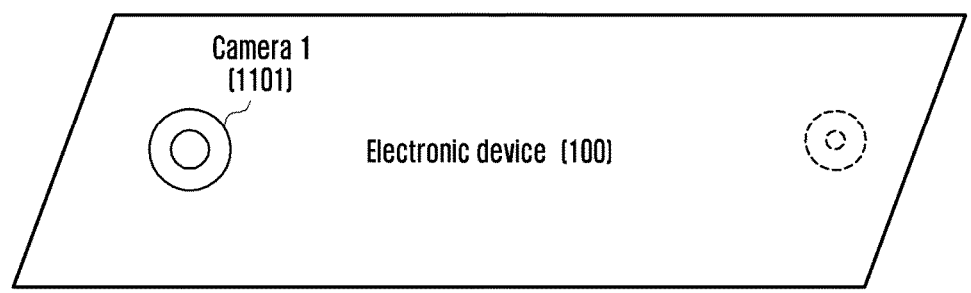
Figure 11B:
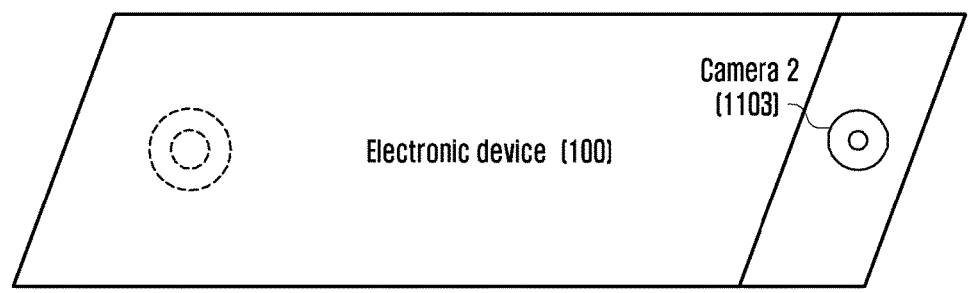

FIGS. 11A and 11B are diagrams illustrating examples of an event indicating a camera/chameleon event in an electronic device, according to an embodiment of the present invention. The chameleon event or the camera event is associated with a camera application of the electronic device 100. FIG. 11A is a diagram illustrating two cameras: a rear camera 1101 and a front camera 1103. The shape of the electronic device 100 is changed to bring both the cameras to at least one side of the shape of the electronic device 100 on identifying the chameleon event. According to an embodiment of the present invention, the user selects a panorama view in the electronic device 100 and the sensing module 201 identifies the selection. The sensing module 201 determines a second shape according to the identified selection and brings both cameras 1101 and 1103 to one side of the electronic device 100. Different areas can be captured from the front camera 1103 and rear camera 1101 at the same time. The area covered by the rear camera 1101 in its field of view is shown in 1102. The area covered by the front camera 1103 in its field of view is shown in 1104. An area 1105 is an overlapping area of the areas 1102 and 1104.

In a single click, the front camera 1103 and the rear camera 1101 simultaneously capture the areas in their field of view, respectively. According to an embodiment of the present invention, the shape of the electronic device 100 is configured to allow the cameras to focus on different areas at the same time.

FIG. 11B is a diagram illustrating a front view and a rear view of an electronic device according to an embodiment of the present invention. In a second shape, the rear camera 1101 is mounted at a bottom of the electronic device 100 with a rear view, while the front camera 1103 is mounted at a top of the electronic device 100 with a front view. The rear view and front view shown each contain one of the cameras on one side of the second shape of the electronic device 100.

Although the embodiments described herein with respect to a camera event refer to two cameras, the mechanism is applicable to more than two cameras in the electronic device 100 in accordance with embodiments of the present invention.

Figure 12A:
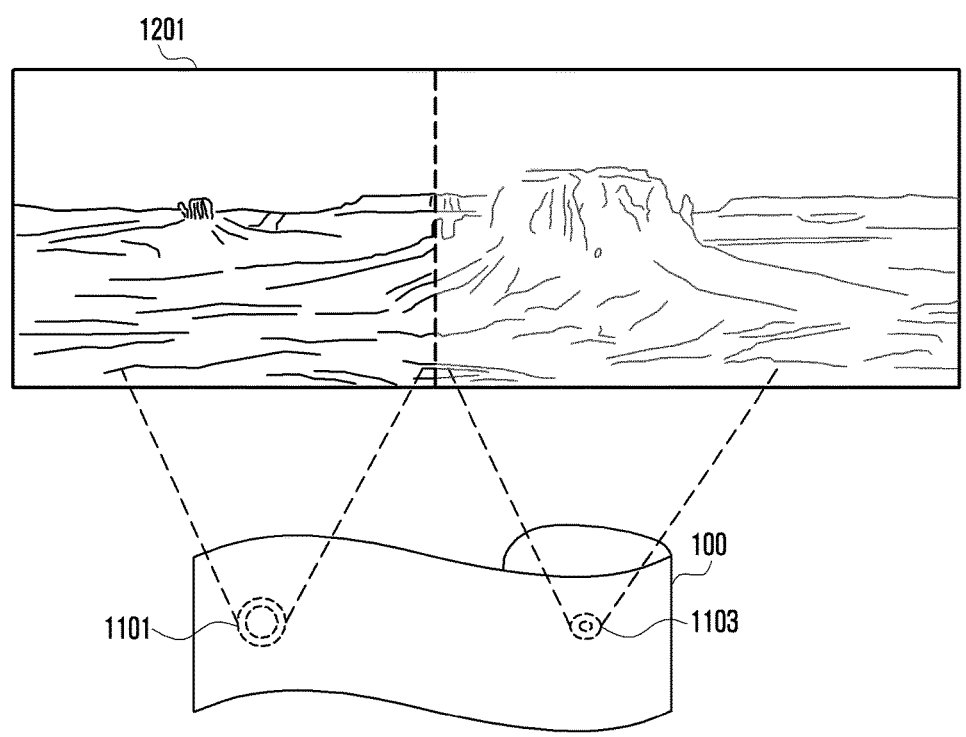
FIGS. 12A, 12B, and 12C are diagrams illustrating an example of capturing a panoramic image by changing a shape of an electronic device according to an event, according to an embodiment of the present invention.
Figure 12B:
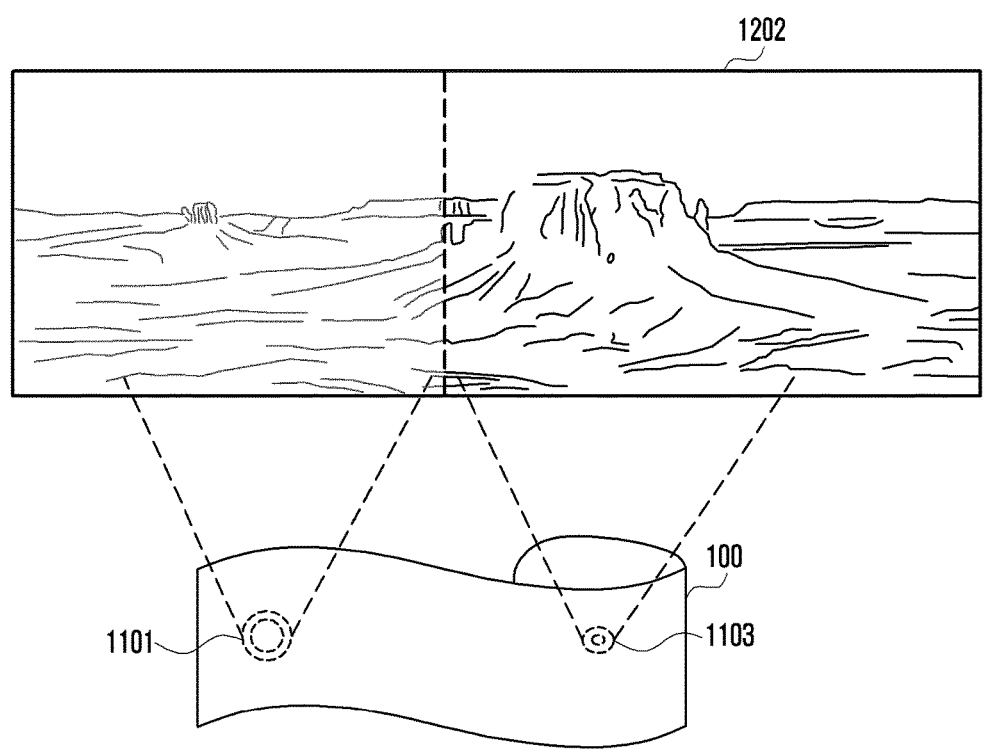
Figure 12C:
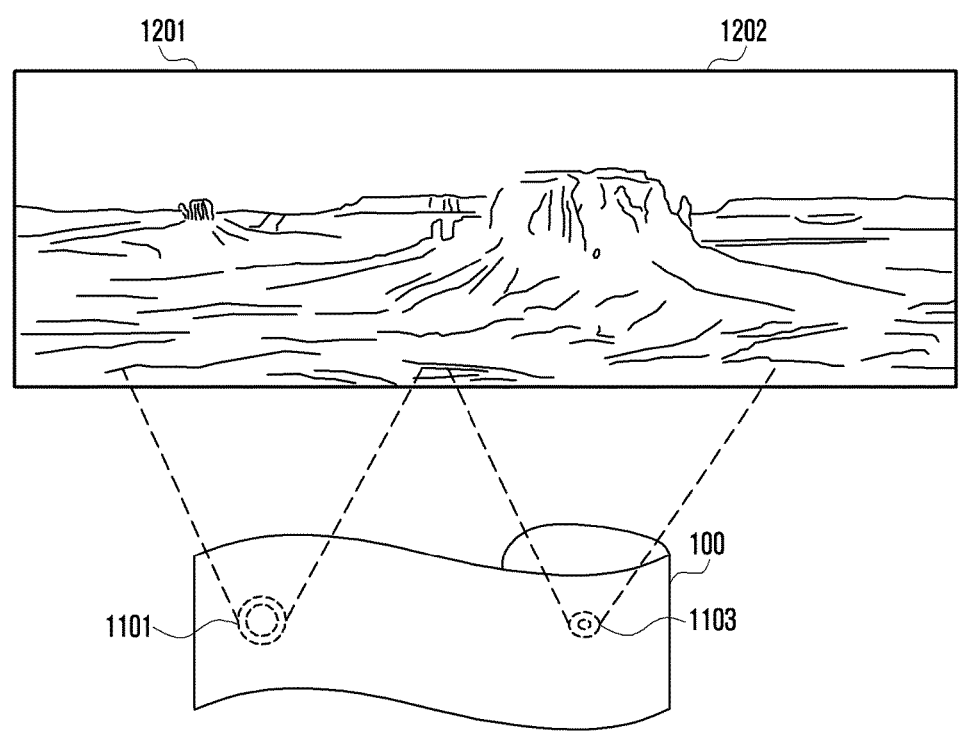

FIGS. 12A, 12B, and 12C are diagrams illustrating an example of capturing a panoramic image by changing the shape of an electronic device according to an event, according to an embodiment of the present invention.

Referring to FIGS. 12A, 12B and 12C, according to an embodiment of the present invention, based on an identification of a camera event, the electronic device 100 changes the first shape to the second shape to assist user in capturing images of different areas at the same time using two cameras 1101 and 1103. In FIG. 12A, the front camera 1103 and the rear camera 1101 of the electronic device 100 are on a same side of the electronic device 100, and capture images of different areas in response to a single click input from a user. FIG. 12A is a diagram illustrating an area 1201 being captured by the rear camera 1101 in a first click. FIG. 12B is a diagram illustrating an area 1202 being captured by the front camera 1103 in the first click. FIG. 12C is a diagram illustrating a panoramic image formed by stitching together images of the captured areas 1201 and 1202.

Although FIG. 12C shows a horizontal panorama view, the second shape of the device 100 may allow cameras to capture vertical view of the captured areas to form a vertical panorama view in accordance with embodiments of the present invention.

Figure 13:
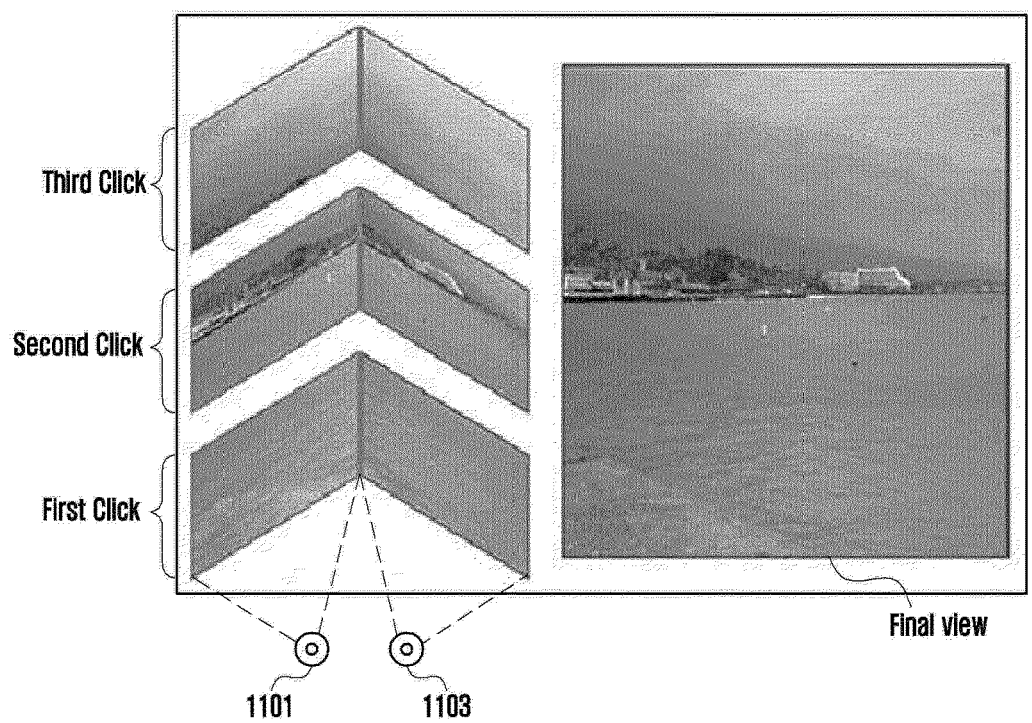
FIG. 13 is a diagram illustrating an example of capturing vertical and horizontal view from one or more cameras according to an event in an electronic device, according to an embodiment of the present invention.

FIG. 13 is a diagram illustrating an example of capturing vertical and horizontal view from one or more cameras according to an event in the electronic device, according to an embodiment of the present invention.

Referring to FIG. 13, cameras 1101 and 1103 of the electronic device 100 positioned at a same side of the electronic device 100 to capture images in a vertical view as well as a horizontal view of a plurality of areas in the field of view of each camera. At each click (e.g., First Click, Second click, Third Click), the rear camera 1101 and the front camera 1103 captures two images of two different areas. The electronic device is configured to stitch the captured images for each click to create a single image of the different areas.

The conventional panorama view settings of existing electronic devices merely allow users to capture only one of a horizontal view or a vertical view. By contrast, the electronic device 100 according to an embodiment of the present invention, allows the user to capture both the horizontal view and vertical view.

Figure 14A:
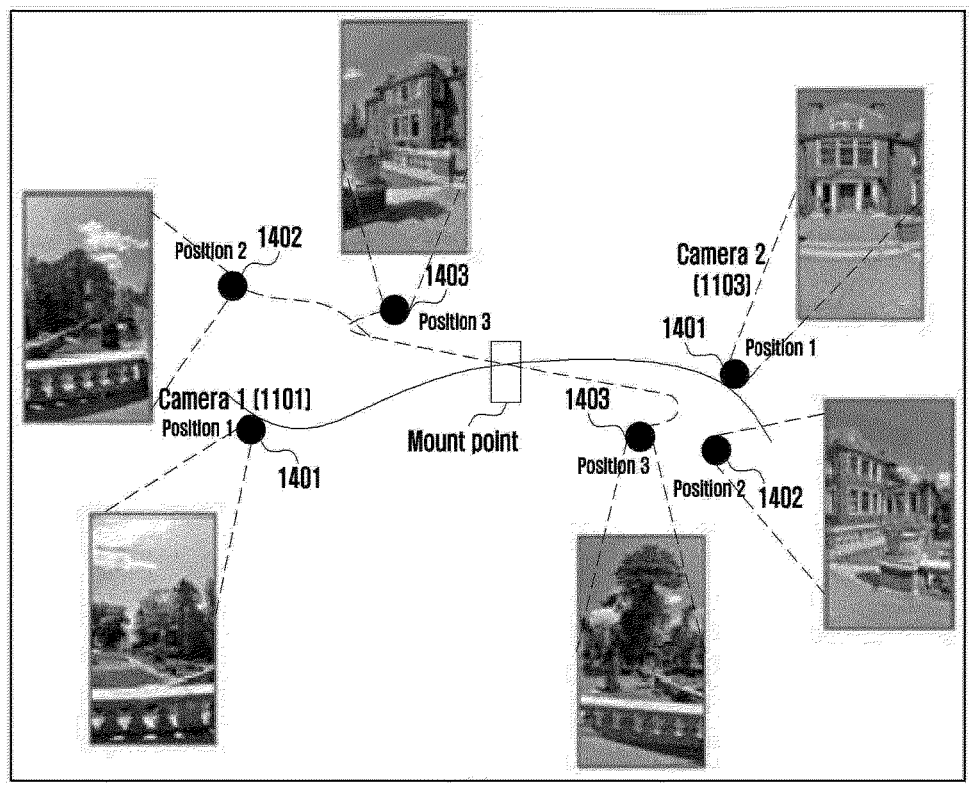
FIG. 14A is a diagram illustrating an example of capturing 360 degree view using different shapes according to an event in an electronic device, according to an embodiment of the present invention.

FIG. 14A is a diagram illustrating an example of capturing a 360 degree view using different shapes according to an event in an electronic device, according to an embodiment of the present invention.

Referring to FIG. 14A, according to an embodiment of the present invention, upon identification of the camera event, the electronic device 100 changes the shape into multiple second shapes. At each second shape the cameras of the electronic device 100 (i.e., camera 1 (1101) and camera 2 (1103) as shown in FIG. 14A) capture images of the areas present in their respective field of view. Each second shape is associated with a particular position of the cameras, such as position 1, position 2 and position 3 of FIG. 14A. At each of the first second shape, related to a first position 1401, the next second shape related to a second position 1402, and the following second shape related to a third position 1403, the camera 1 and camera 2 captured images as shown in FIG. 14A. The electronic device 100 shifts between each of the second shapes to provide different views of the image to be captured.

Figure 14B:
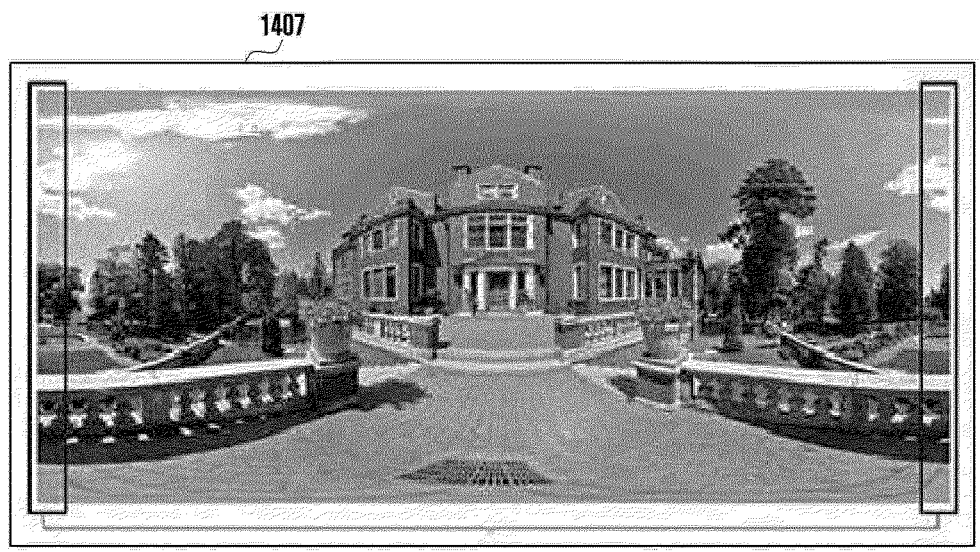
FIG. 14B is a diagram illustrating an example of a full angle view of a stitched image according to an event in an electronic device, according to an embodiment of the present invention.

FIG. 14B is a diagram illustrating an example of a full angle view of a stitched image according to a camera event in an electronic device, according to an embodiment of the present invention.

Referring to FIG. 14B, the full angle view refers to a 360-degree view in the camera event. The image 1407 of FIG. 14B represents the output produced by stitching the captured images from both the cameras at positions 1401, 1402 and 1403, respectively of FIG. 14A. According to an embodiment of the present invention, the electronic device 100 can be mounted at a single center point and the camera event can be activated to capture the 360 degree view. For example, the electronic device 100 can be mounted on a tripod to capture the 360 degree view.

An electronic device 100 according to embodiments of the present invention is able to capture any angle view of the area and is not restricted to capturing only 360-degree view/full angle view of the above-described example.

Although FIGS. 14A and 14B refer to an example using two cameras for capturing a 360 degree view, any number of cameras may be configured to capture the 360 degree view when the camera event is triggered in the electronic device 100 in accordance with embodiments of the present invention.

Figure 15:
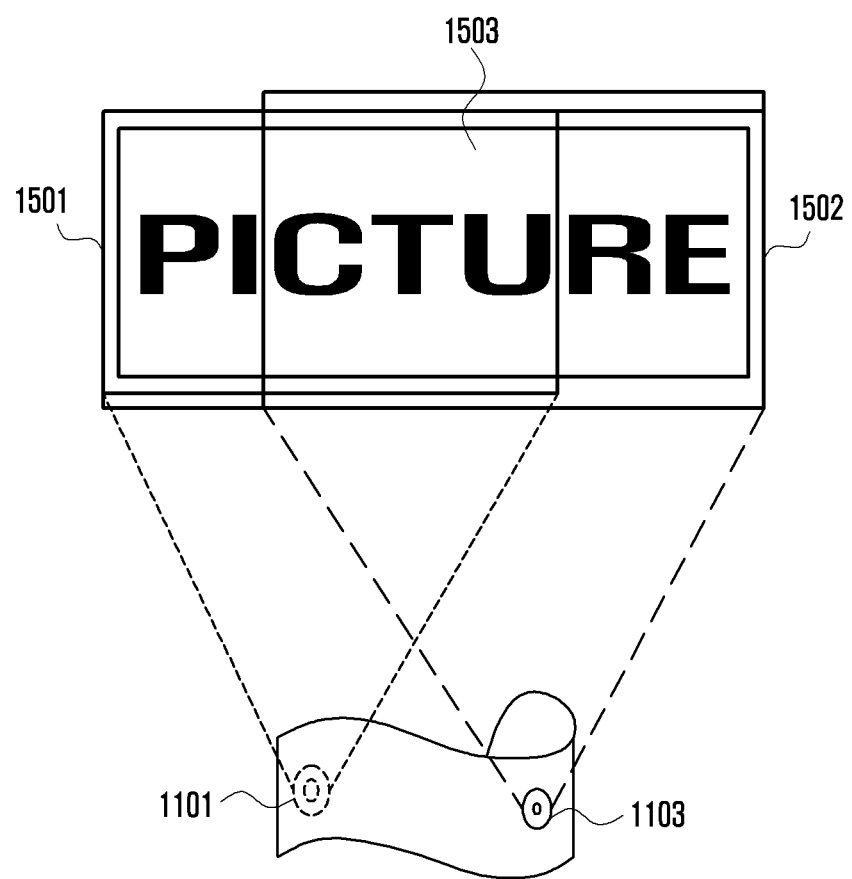
FIG. 15 is a diagram illustrating an example of depth perception of an image according to an event in an electronic device, according to an embodiment of the present invention.

FIG. 15 is a diagram illustrating an example of depth perception of an image according to an event in an electronic device, according to an embodiment of the present invention.

Referring to FIG. 15, two different images 1501 and 1502 are captured by two different cameras 1101 and 1103, respectively. The image 1503 represents a common overlapping area. The capture of the same area from two different cameras 1101 and 1103 improves the depth perception of the image being captured in the camera event. Combining the two images 1501 and 1502 brings out a better quality picture. According to an embodiment of the present invention, the same image can be captured from different angles. Two different images 1501 and 1502 can be captured from different angles of cameras 1101 and 1103. The images captured due to different angles can allow a user to view the same area differently in each captured image.

FIGS. 16A to 16E are diagrams illustrating examples of automatic changes in shapes of an electronic device based on a sensing event in the electronic device, according to an embodiment of the present invention.

Figure 16A:
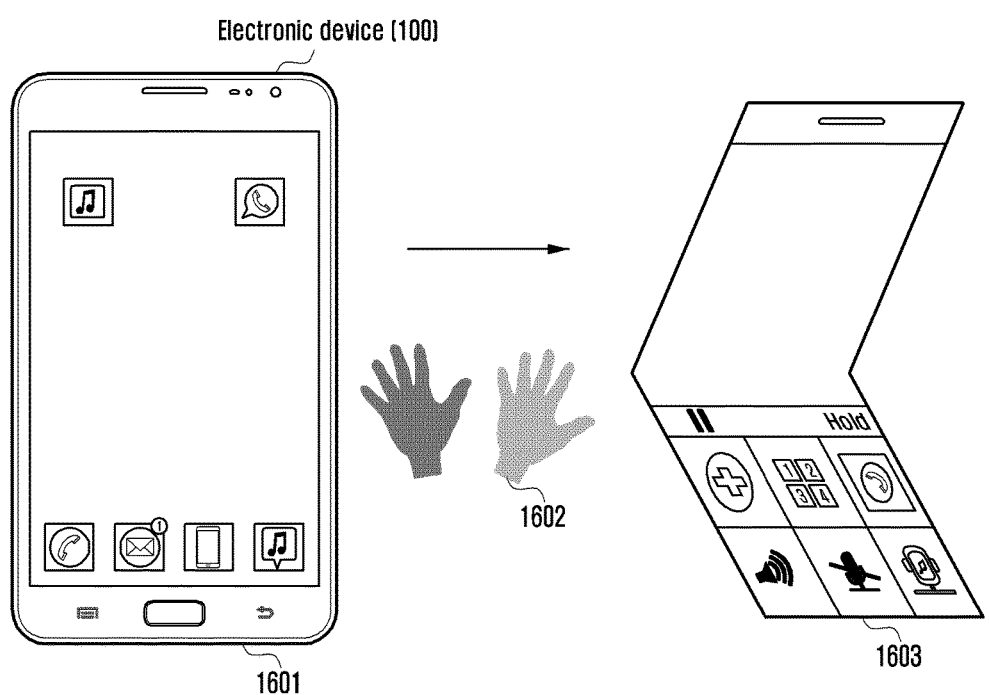
FIGS. 16A to 16F are diagrams illustrating examples of automatic changes in shapes of an electronic device based on a sensing event in the electronic device, according to an embodiment of the present invention.

FIG. 16A is a diagram illustrating the first shape 1601 of the electronic device 100. Referring to FIGS. 2, 4, and 16A, when the sensing module 201 identifies a sensing event 401 such as a gesture, the sensing module 201 sends the signal to the control module 202. The control module 202 determines the second shape of the electronic device 100. Further, the control module 202 invokes the shape control module 203 to change the first shape 1601 to a second shape 1603. The sensing event 401 is identified based on the gesture performed by the user. The second shape 1603 is determined based on the sensed gesture (i.e., hand wave gesture 1602). The gesture 1602 of the user is associated with the second shape 1603 of the device. The electronic device 100 changes its shape to the second shape based on the identified sensing event 401. The second shape 1603 allows the user to interact with the electronic device 100 easily.

Figure 16B:
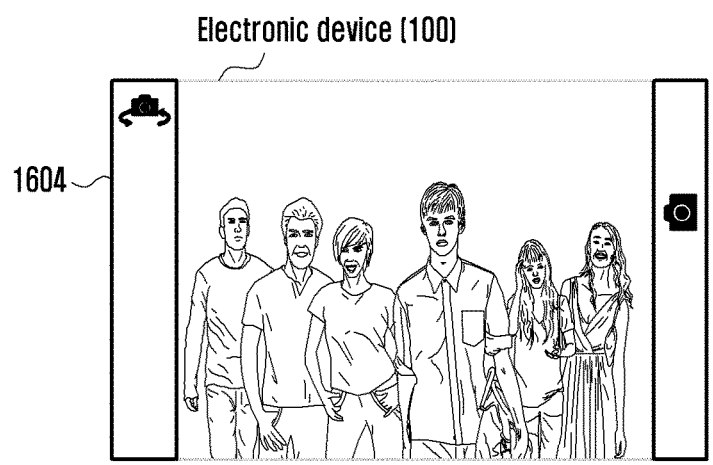
Figure 16B:
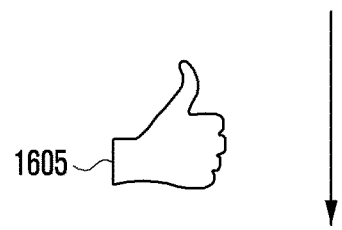
Figure 16B:
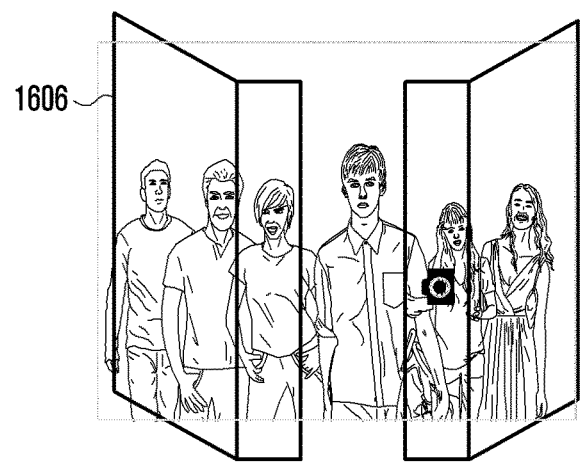

FIG. 16B is a diagram illustrating the first shape 1604 of the electronic device 100. Referring to FIGS. 2, 4, and 16B, when a gesture is sensed by the sensing module 201, then the sensing module 201 sends a signal to control module 202. The control module 202 determines the second shape of the electronic device 100. According to an embodiment of the present invention, the control module 202 determines the second shape of the electronic device 100 based on pre-configured information by the user. Further, the control module 202 invokes the shape control module 203 to change first shape of the electronic device 100 to the second shape 1606 upon detecting a gesture 1605 from the user. The sensing event 401 is identified based on the gesture 1605 performed by the user. The second shape 1606 is determined based on the sensed gesture 1605. The gesture 1605 of the user is associated with the second shape 1606. While in the first shape 1604, the electronic device 100 shows a camera application. Upon detecting the user gesture 1605 (i.e., a thumbs up) the shape of the electronic device 100 is changed to the second shape 1606 to provide the user with a better grip while capturing pictures.

Figure 16C:
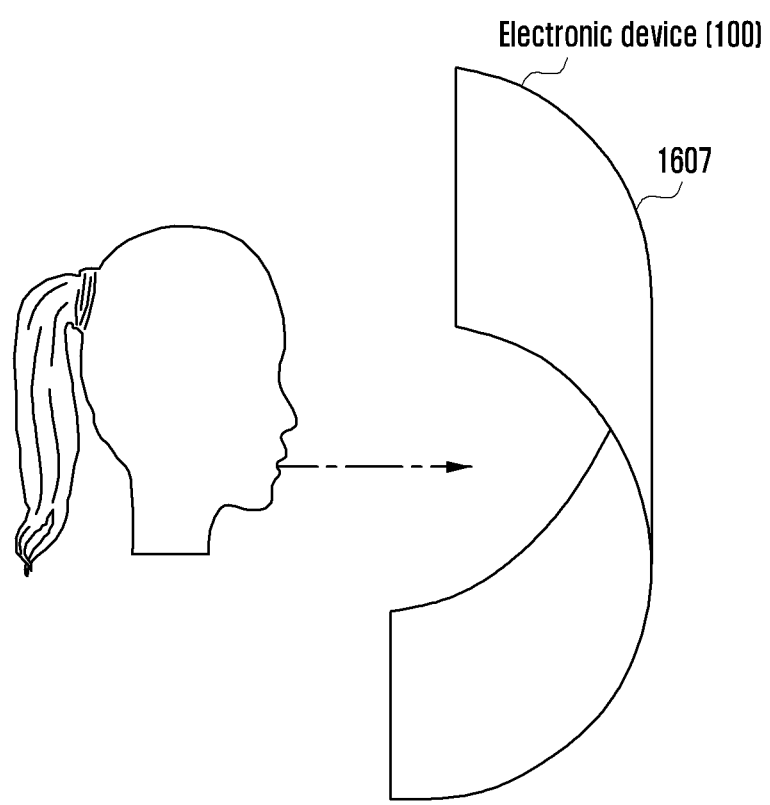
Figure 16D:
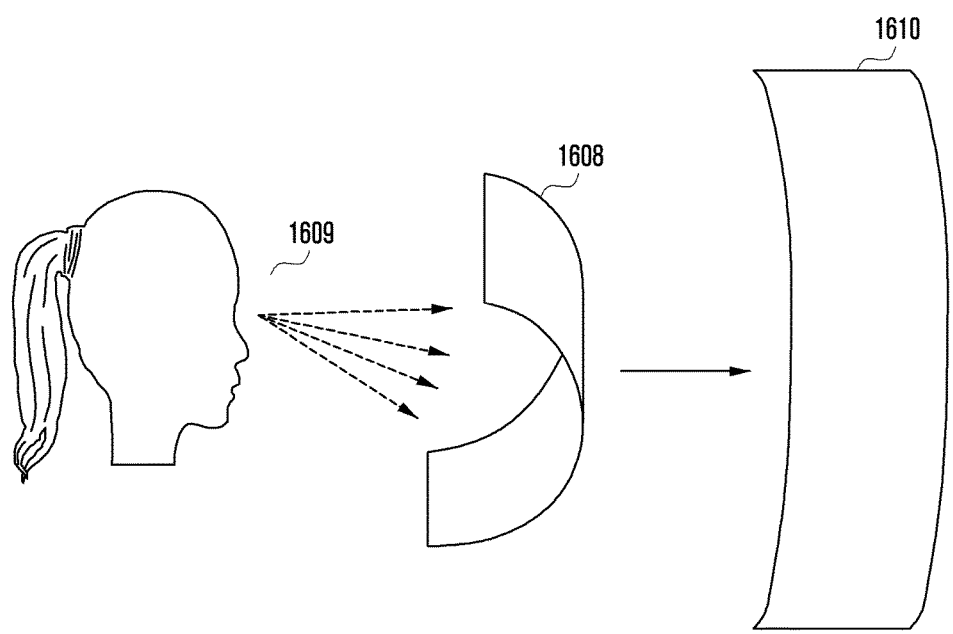
Figure 16E:
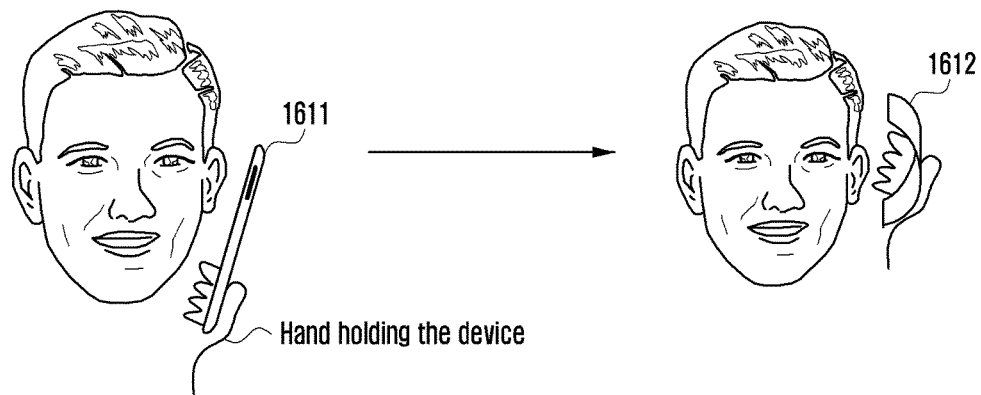

FIG. 16C is a diagram illustrating a second shape of an electronic device in response to detection of air expelled from the mouth of the user according to an embodiment of the present invention.

Referring to FIGS. 2, 4, and 16C, the sensing module 201 identifies a sensing event 401, such as air blown from the user. Sensing module 201 can be a humidity sensor or a temperature sensor, and can detect the air expelled from the mouth of a user. The electronic device 100 is configured to change its shape from its current shape (not shown in FIG. 16C) to a second shape 1607. The gesture of user is associated with the second shape 1607. The electronic device 100 changes its shape to the second shape 1607 based on the identified sensing event 401. According to another embodiment of the present invention, a microphone of the electronic device 100 is configured to detect air blown from the user.

Referring to FIGS. 2, 4, 6, and 16D, according to another embodiment of the present invention, a first shape 1608 of the electronic device 100 changes into a second shape 1610 in response to identification of a sensing event 401. The sensing event 401 is identified based on tracking the eye movement of the user by the sensing module 201. According to an embodiment of the present invention, the sensing module 201 can include a dynamic vision sensor (not shown) to sense the eye movement. The electronic device 100 changes its shape based on an input received by the dynamic vision sensor. More specifically, the electronic device 100 changes its shape from the first shape 1608 to the second shape 1610 based on the identified sensing event 401. The first shape 1608 of the electronic device 100 shows a curved shape. The dynamic vision sensor tracks the eye movement 1609 of the user. The sensing module 201 senses the eye movement of the user and sends the sensed movement to the control module 202. The control module 202 determines the second shape of the electronic device 100. Once the control module 202 determines the second shape of the electronic device 100, the control module 202 sends the determined second shape to the shape control module 203. The shape control module 203 invokes the shape control layer 101, the actuators in the electronic device 100 are inflated, and the electronic device 100 changes its shape to the second shape 1610. For example, if the user is reading a document on the electronic device 100, when the user reaches a last set of lines of the document, the sensing module 201 captures the user's eye movement and changes the shape of the electronic device 100 displaying only the last set of lines of the document. This change in shape improves the user's experience with the electronic device 100.

Referring to FIGS. 2, 4, 6, and 16E, according to another embodiment of the present invention, a current shape 1611 of the electronic device 100 changes into a second shape 1612 in response to identification of the sensing event 401. The sensing module 201 identifies a sensing event 401, such as the position of the electronic device 100 being held by the user, and sends the sensed event to the control module 202. The control module 202 determines the second shape of the electronic device 100, and sends the determined second shape to the shape control module 203. The shape control module 203 invokes the shape control layer 101, and the actuators in the shape control layer 101 change the first shape 1611 of the electronic device 100 to the second shape 1612. The first shape 1611 of the electronic device 100 is used to show the user holding the device 100 when a call is received. Upon identifying an ambient noise, the device 100 changes its shape to the second shape 1612. According to an embodiment of the present invention, the tactile sensor identifies the pressure created by holding (e.g., softly or strongly holding) the electronic device 100 and the shape of the electronic device 100 is changed according to the detected pressure. For example, when the user strongly holds the electronic device 100, the shape of the electronic device 100 changes based on a pre-defined second shape. For example, when the user wants the electronic device 100 to become compact before placing it in his/her pocket, the user can strongly hold the electronic device 100, and, in response, the electronic device 100 automatically changes its shape to make the electronic device 100 more compact for storage in the user's pocket.

Figure 16F:
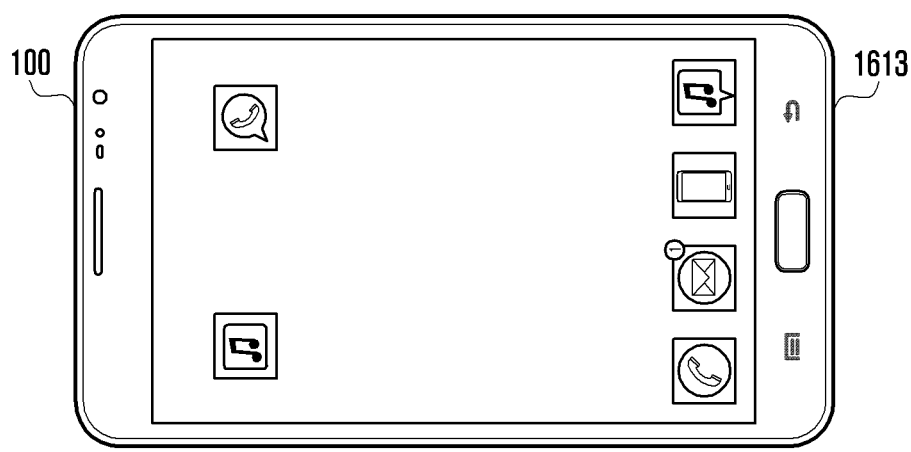
Figure 16F:
Figure 16F:
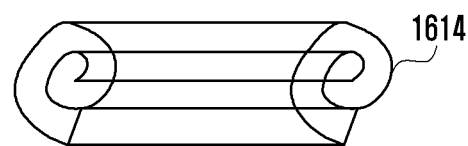

Referring to FIGS. 2, 4, and 16F, according to another embodiment of the present invention, a first shape 1613 of the electronic device 100, a sensing module 201 identifies the possibility of the electronic device 100 falling down or being dropped. For example, the sensing module 201 can be a gravitational sensor. The electronic device 100 changes its shape based on an input received from the sensing module 201. More specifically, when the sensing module 201 identifies a sensing event 401 such as falling down or being dropped, then the electronic device 100 changes its shape from a first shape 1613 to a second shape 1614 based on the identified sensing event 401. The first shape 1613 is a flat shape. When a possibility of falling down or being dropped is detected, the electronic device 100 changes the first shape 1613 to the second shape 1614, in which the electronic device 100 is in a rolled up shape, in order to minimize damage from a potential fall or drop.

Figure 17:
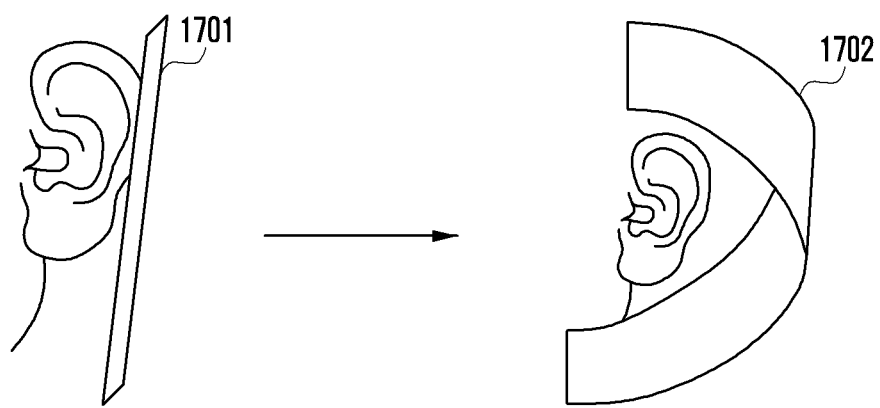
FIG. 17 is a diagram illustrating an example where a shape of an electronic device is changed based on ambient conditions recognized by a sensor in the electronic device, according to an embodiment of the present invention.

FIG. 17 is a diagram illustrating an example where the shape of the electronic device is changed based on ambient conditions recognized by a sensor in the electronic device, according to an embodiment of the present invention.

Referring to FIGS. 1-2, 4, and 17, a first shape 1701 of the electronic device 100 is associated with a user communicating using the electronic device 100. When the sensing module 201 identifies ambient noise present in the surroundings, the sensing module 201 sends the identified sensing event 401 to the control module 202. The control module 202 determines a second shape of the electronic device 100, and sends the determined second shape to the shape control module 203. The shape control module 203 invokes the shape control layer 101, and the actuators in the shape control layer 101 are inflated. Thus, based on the ambient conditions, the electronic device 100 changes the first shape 1701 to a second shape 1702 for better noise cancellation and improved audio quality.

Figure 18:
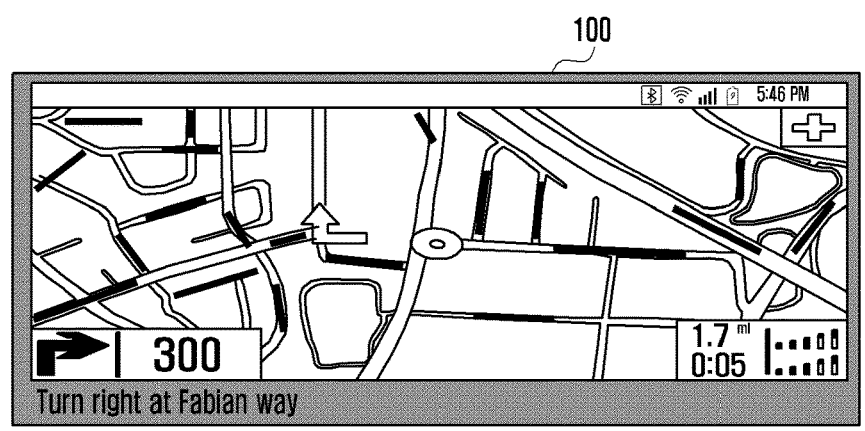
FIG. 18 is a diagram illustrating an example in which a shape of an electronic device is changed based a context event, according to an embodiment of the present invention.
Figure 18:
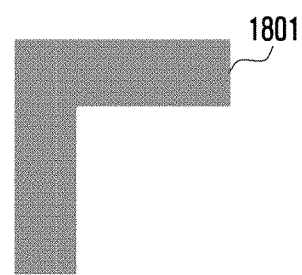
Figure 18:
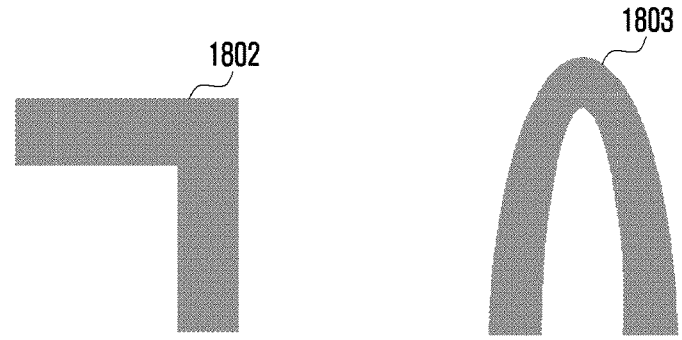

FIG. 18 is a diagram illustrating an example in which the shape of an electronic device is changed based on a context event, according to an embodiment of the present invention.

Referring to FIGS. 2 and 18, a display of an electronic device 100 provides a GPS navigation screen to a user. The sensing module 201 identifies GPS navigation information and sends the identified GPS navigation information to the control module 202. The control module 202 determines the second shape of the electronic device 100. According to an embodiment of the present invention, different navigation information corresponds to different respective second shapes. The control module 203 sends the determined second shape to the shape control module 203 to change the shape of the electronic device 100 to the second shape. As shown in FIG. 18, the electronic device 100 changes its shape based on the navigation information identified by the sensing module 201. When the user needs to turn right on the road, a right arrow and an indication of distance from a current location to the right turn is displayed on the electronic device 100. Based on the arrow, the shape of the electronic device 100 can change into any of a plurality of second shapes as shown. FIG. 18 shows three different second shapes 1801, 1802, and 1803 of the electronic device 100. The shape in 1801 identifies a right turn by the change in shape. The shape in 1802 identifies a left turn by the change in shape. The shape in 1803 identifies a U-turn by the change in shape.

According to another embodiment of the present invention, the electronic device 100 changes its shape in accordance with a physical exercise routine. For example, the electronic device 100 changes its shape based on a physical exercise application, by twisting to the left or right, or by bending. The user can view the change in shape and perform a corresponding physical exercise.

Figure 19A:
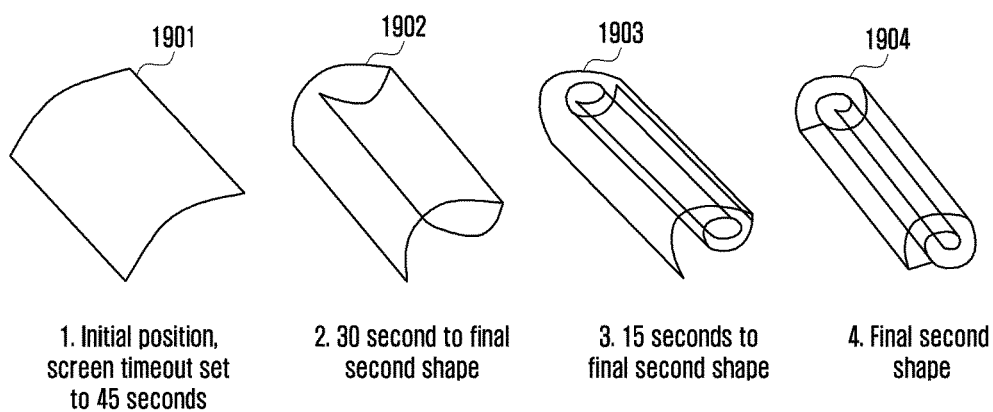
FIG. 19A and FIG. 19B are diagrams illustrating an example of automatic changes in a shape of an electronic device based on progress of an operation in the electronic device, according to embodiments of the present invention.
Figure 19B:
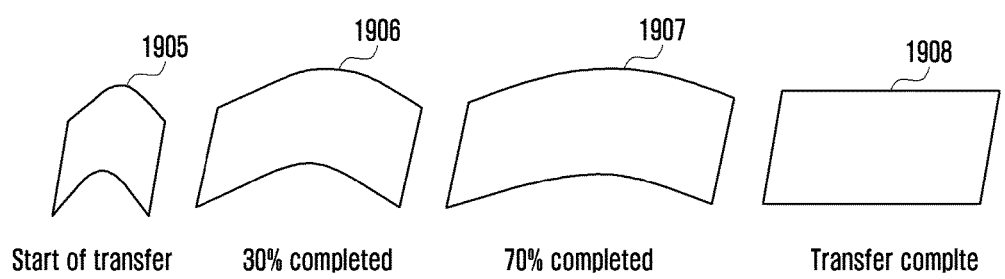

FIG. 19A and FIG. 19B are diagram illustrating examples of automatic changes in shape of an electronic device based on progress of an operation in an electronic device, according to an embodiment of the present invention.

Referring to FIGS. 1, 2, and 19A, according to an embodiment of the present invention, the sensing module 201 identifies the time left for screen timeout operation in the electronic device 100, and sends the identified time left to the control module 202. The control module 202 determines each of a plurality of second shapes 1902-1904 depicting the time left for screen timeout operation. For example, the screen time out is set for 45 seconds at the first shape 1901. The screen time out is set for 30 seconds to final second shape at the second shape 1902. The screen time out is set for 15 seconds to final second shape at the second shape 1903. The final second shape 1904 of device after screen time out is a rolled up shape as shown in 1904. The final second shape 1904 indicates that the screen is timed out and device is in hibernation. At each second shape, the time left for the screen timeout to be completed is identified based on the shape of the device.

According to another embodiment of the present invention, when the user sets an alarm, the electronic device 100 divides the interval event into at least onetime interval. The first shape of the electronic device 100 is a rolled up shape as shown in 1904. In the final shape, the electronic device 100 is configured to change its shape to 1901 from the rolled up shape as shown in 1904. At each interval the electronic device 100 is configured to change its shape to indicate the time left for alarm to ring. The user is able identify the time left for the alarm ring based on the shape of the electronic device 100.

FIG. 19B is a diagram illustrating a progress level of a transfer operation and multiple second shapes associated with it.

Referring to FIGS. 1, 2, and 19B, according to an embodiment of the present invention, a shape of the electronic device 100 indicates a file transfer completion in an interval event. More specifically, the shape of the electronic device 100 indicates a remaining time for a screen timeout operation at each of a plurality of second shapes 1906-1908. Each of the plurality of second shapes 1906-1908 is associated with a different amount of time remaining to complete the download operation associated with the event. The sensing module 201 identifies the file transfer operation, and the control module 202 determines the plurality of second shapes 1906-1908 of the electronic device 100. The electronic device 100 is in the first shape 1905 at the beginning of the transfer. When 30% of the transfer is completed, the first shape 1905 changes to a second shape 1906. When 70% of the transfer is completed, the second shape 1906 changes to a second shape 1907. The final second shape of electronic device 100 after completion of the transfer is shown in 1908. The final second shape 1908 indicates that the file transfer is complete. At each shape, the progress level of the transfer operation is identified based on the shape of the electronic device 100.

For example, according to an embodiment of the present invention, when the user downloads a document, the electronic device 100 breaks the download operation percentage into plurality of operations. Each individual download operation is associated with a certain progress level of the operation. The first shape of the device 100 can be curved device as shown in 1905. In the final shape 1908, the electronic device 100 changes its shape to opens up completely from the curved up current shape. At each individual download operation, the electronic device 100 changes its shape to indicate the progress level of the download. The user identifies the percentage of completion of transfer based on the shape of the electronic device 100.

The above-described events of changing shape according to download progress allows users to easily identify time left to complete a download operation and progress level with respect to completion of an operation. Examples of such operations include, but are not limited to a file transfer, audio/video playing progress, download progress, upload progress, brightness control, volume, and time for screen time out, alarm, reminder, etc.

Figure 20:
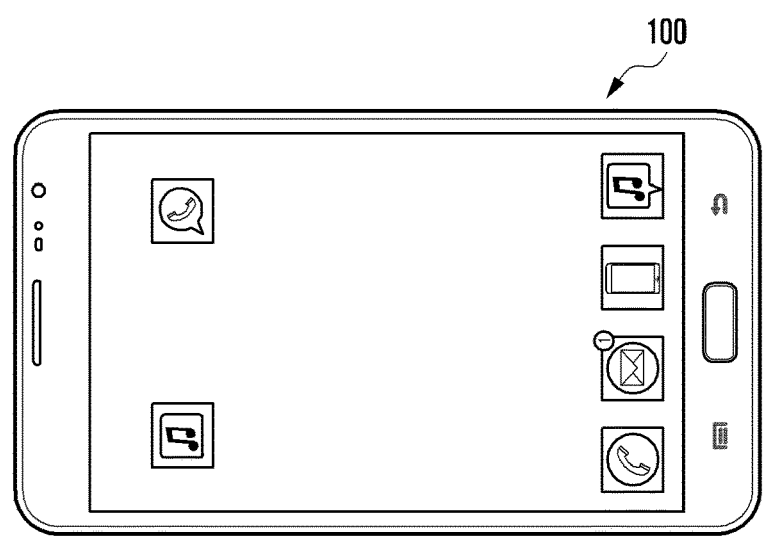
FIG. 20 is a diagram illustrating an example of an electronic device in a rolled up shape indicating a notification event in the electronic device, according to an embodiment of the present invention.
Figure 20:
Figure 20:
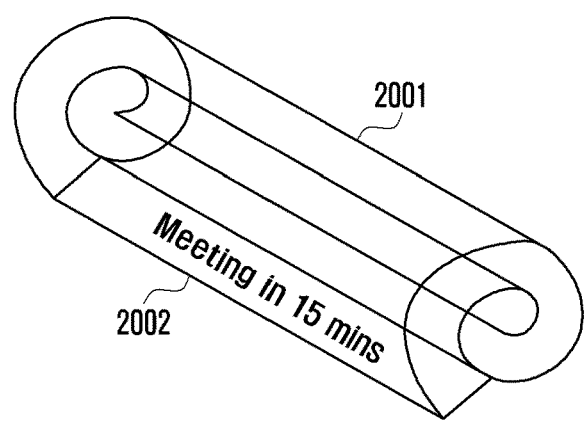

FIG. 20 is a diagram illustrating an example of an electronic device in a rolled-up shape indicating a sensing event in the electronic device, according to an embodiment of the present invention.

Referring to FIGS. 2 and 20, an electronic device 100 in a second shape 2001 contains a part 2002 of the display showing a notification to the user. Upon identifying an incoming notification in a rolled up shape, the electronic device 100 changes its shape and displays the notification to the part (2002) of the display as shown in FIG. 20. Examples of the notification displayed to the user include, but are not limited to, application notifications, network notifications, events, reminders, schedule, etc.

FIGS. 21A, 21B, 21C and 21D are diagrams illustrating examples of changes in shapes of the electronic device based on different gesture events, according to embodiments of the present invention.

Referring to FIGS. 2, 4, 21A, and FIG. 21B, according to an embodiment of the present invention, a user makes free hand drawings on the electronic device 100. The sensing module 201 identifies this touch gesture and a sensing event 401. The sensing module 201 sends the identified sensing event 401 to the control module 202. The control module 202 determines the second shape associated with the sensing event 401 (i.e., in FIG. 21A, a touch gesture in an 'L' shape). The shape control module 203 changes the shape of the electronic device 100 to the 'L' shape.

Figure 21A:
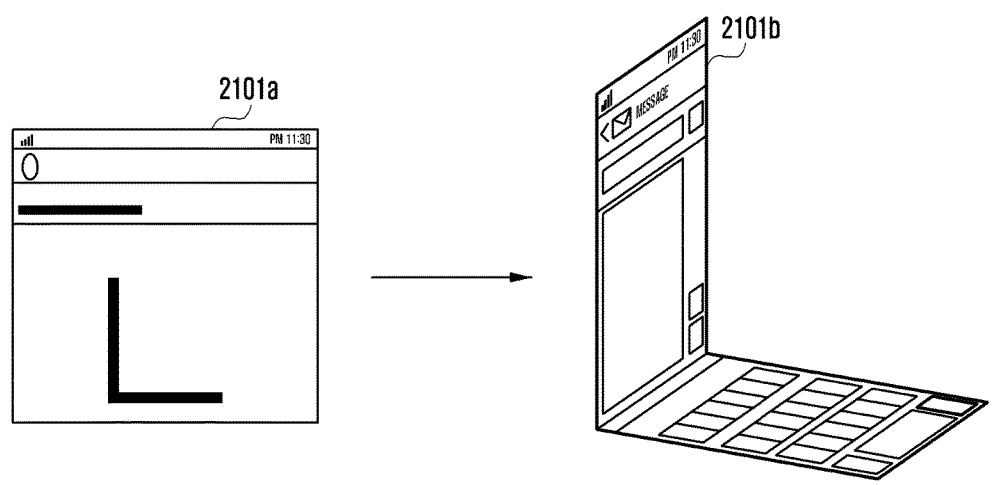
FIGS. 21A, 21B, 21C and 21D are diagrams illustrating examples of changes in shapes of an electronic device based on different gesture events, according to an embodiment of the present invention.
Figure 21B:
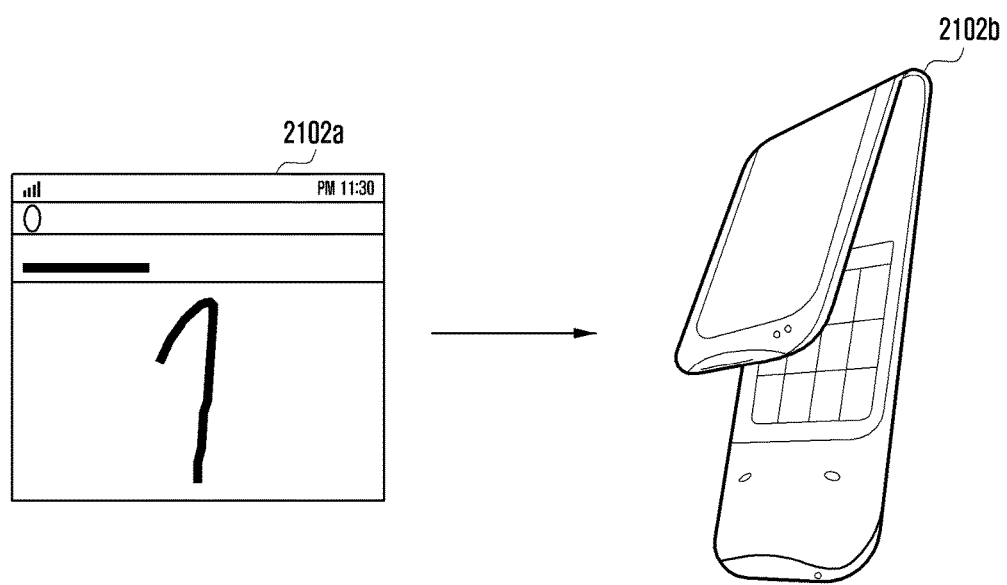

FIG. 21A shows a display 2101a including an L shaped free hand drawing input while the electronic device 100 is in a first shape, and an L shaped electronic device 100 in a second shape 2101b. FIG. 21B is a diagram illustrating a display 2102a including an inverted U shape free hand drawing input while the electronic device 100 is in a first shape, which changes to the inverted U shape as the second shape 2102b.

Figure 21C:
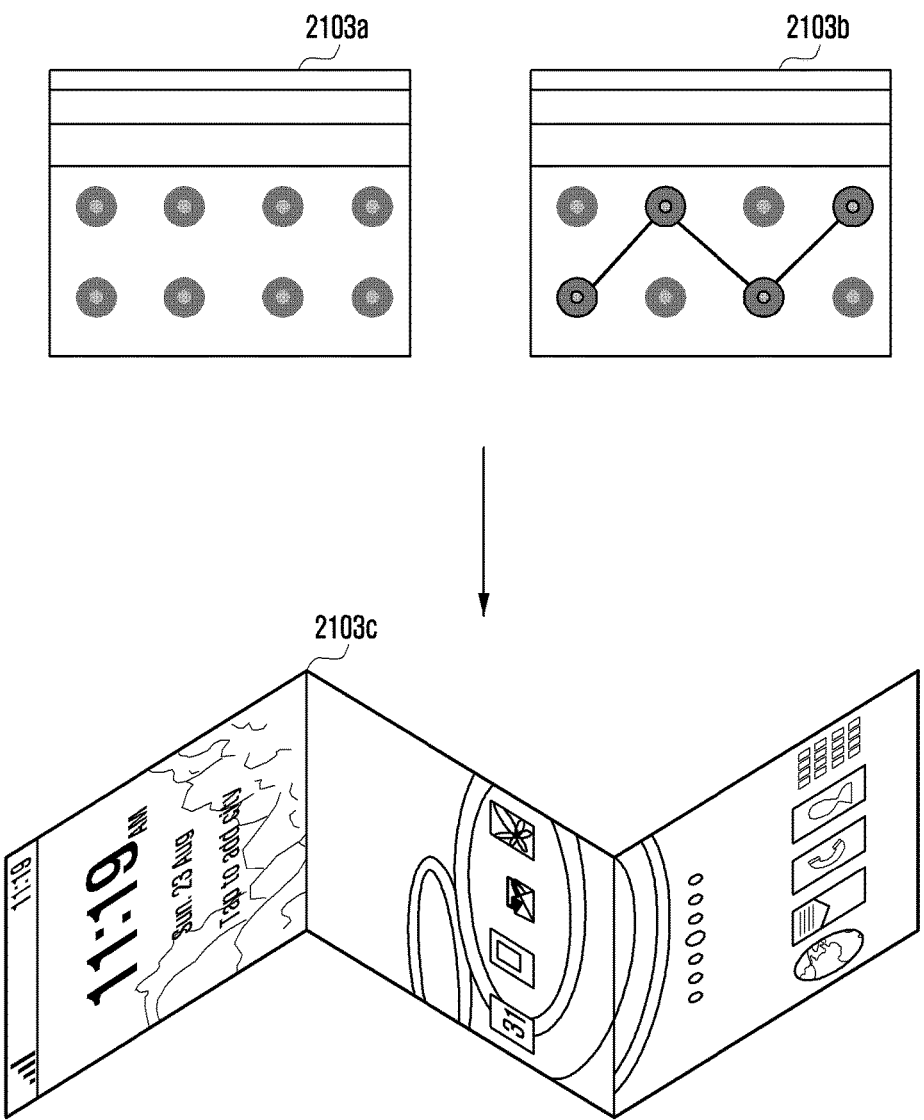
Figure 21D:
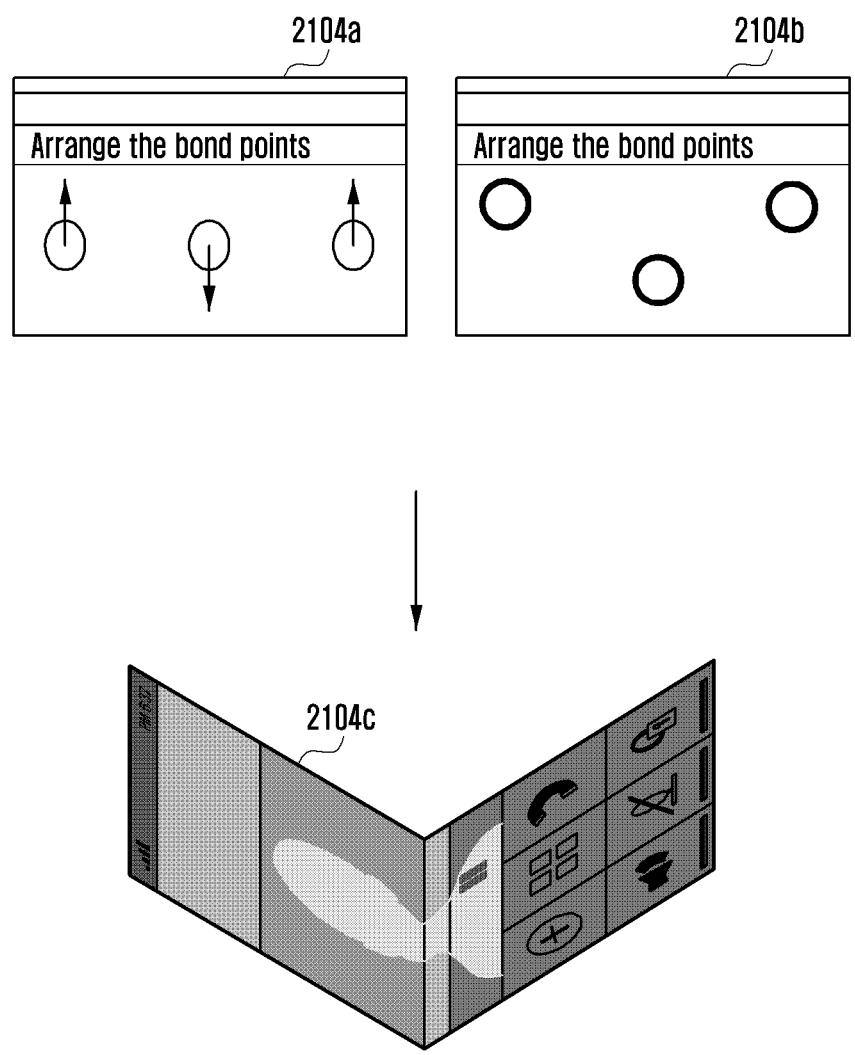

FIGS. 21C and 21D depict embodiments of the present invention in which a user provides input creating desired patterns related to changing the shape of the electronic device 100. The electronic device 100 changes its shape based on the gesture of the user provide in the pattern of dots.

Referring to FIGS. 1-2, 4, 6, 21C, and 21D, the sensing module 201 identifies the pattern, and the sensing event 201 sends the identified pattern to the control module 202. The control module 202 determines the second shape and sends the determined second shape to the shape control module 203. The shape control module 203 invokes the shape control layer 101 to change to the determined second shape. The actuators 601 in the shape control layer 101 are inflated, and the shape of the electronic device 100 is changed to the drawn pattern shape.

FIG. 21C shows a display screen 2103a for receiving a pattern, a pattern sensed by the sensing module 201 on a display screen 2103b, and a second shape 2103c of the electronic device 100 associated with the identified sensing event 401.

FIG. 21D shows a display screen 2104a for receiving a pattern and a display screen 2104b displayed a pattern sensed by the sensing module 201. The arrangement of bend points defines the second shape 2104c of the electronic device 100. FIG. 21D also shows the electronic device 100 in the second shape 2104c corresponding to the pattern.

Although the description of the embodiments of the present invention corresponding to FIGS. 21A-21D refer to change in the shape of an electronic device in response to user input (i.e., gestures) like patterns and free hand drawing, user input in accordance with embodiments of the present invention is not limited to gestures. For example, a user's voice or a pre-defined audio input can also be considered as user input, such that a sensor on an electronic device recognizes the audio input, and the electronic device changes its shape based on the audio input.

Figure 22:
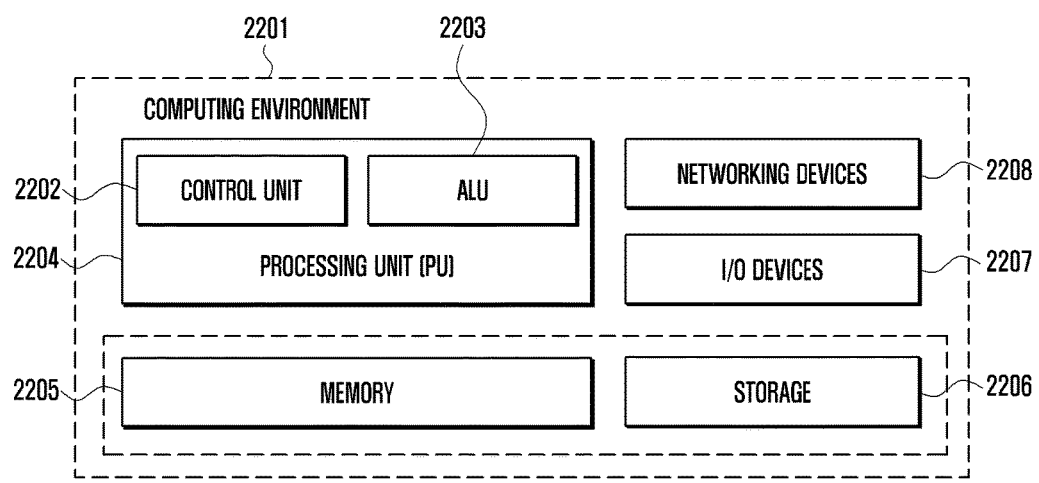
FIG. 22 is a diagram illustrating a computing environment implementing systems and methods for automatically changing a shape of an electronic device, in accordance with various embodiments of the present invention.

FIG. 22 is a diagram illustrating a computing environment implementing systems and methods for automatically changing a shape of the electronic device, in accordance with various embodiments of the present invention.

Referring to FIG. 22, a computing environment 2201 includes at least one processing unit 2204 that is equipped with a control unit 2202 and an Arithmetic Logic Unit (ALU) 2203. The computing environment 2201 further includes a memory 2205, a storage unit 2206, plurality of networking devices 2208, and a plurality Input output (I/O) devices 2207. The processing unit 2204 is responsible for processing the instructions of algorithms performed in accordance with embodiments of the present invention. The processing unit 2204 receives commands from the control unit 2202 in order to perform its processing. Further, any logical and arithmetic operations involved in the execution of the instructions are computed with the help of the ALU 2203.

The overall computing environment 2201 can include multiple homogeneous and/or heterogeneous cores, multiple CPUs of different kinds, special media and other accelerators. Further, the plurality of process units may be located on a single chip or over multiple chips.

Algorithms including instructions and codes required for implementation of operations according to embodiments of the present invention are stored in either the memory unit 2205 or the storage 2206 or both. At the time of execution, the instructions may be fetched from the corresponding memory 2205 and/or storage 2206, and executed by the processing unit 2204. The processing unit 2204 synchronizes the operations and executes the instructions based on the timing signals generated by the clock chip (not shown). Embodiments of the present invention described herein can be implemented through at least one software program running on at least one hardware device and performing network management functions to control the elements. The elements shown in the FIG. 22 may include various units, blocks, modules, or steps described in relation with methods, processes, algorithms, or systems of the present invention, which can be implemented using any general purpose processor and any combination of programming language, application, and embedded processor.

The embodiments disclosed herein can be implemented through at least one software program running on at least one hardware device and performing network management functions to control the elements. Elements of the present invention shown in the accompanying drawings can include blocks, each of which can include one or more hardware devices, or a combination of at least one hardware device and a software module.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method for automatically changing a shape of a flexible electronic device, the method comprising:
   identifying, by the flexible electronic device, at least one event triggered in the flexible electronic device; and
   changing, by the flexible electronic device, the shape of a surface of the flexible electronic device, according to the at least one identified event,
   wherein the changing of the shape of the surface of the flexible electronic device comprises changing, if the at least one event is associated with at least one camera, the shape of the flexible electronic device such that the at least one camera is positioned to at least one side of the flexible electronic device, according to the at least one event associated with the at least one camera.

2. The method of claim 1, wherein the at least one event is triggered by at least one of an external event and an internal event.

3. The method of claim 1, wherein changing the shape of the flexible electronic device according to the at least one identified event comprises:
   determining at least one shape for the flexible electronic device according to the at least one identified event; and
   changing the shape of the flexible electronic device according to the at least one determined shape.

4. The method of claim 3, wherein changing the shape of the flexible electronic device according to the at least one determined shape further comprises:
   applying an inflation strength to at least one actuator to change the shape of the flexible electronic device, wherein the at least one actuator causes a surface of the flexible electronic device to project according to the at least one determined shape.

5. The method of claim 4, further comprising:
   balancing the projected surface by controlling a magnetic field strength of at least one electro magnet according to the at least one determined shape; and
   maintaining the flexible electronic device in the at least one determined shape using the magnetic field strength.

6. The method of claim 3, further comprising:
   determining whether the at least one event is associated with a camera event;
   determining at least one shape associated with the camera event; and
   changing the shape of the flexible electronic device according to the at least one determined shape,
   wherein the change in shape causes a plurality of cameras on the electronic device to be positioned to at least one side of the flexible electronic device.

7. The method of claim 6, further comprising:
   capturing a plurality of images in a field of view of the plurality of cameras at a time; and
   stitching the captured plurality of images together to create a single image of a plurality of areas included in the plurality of images.

8. The method of claim 7, wherein the plurality of captured images includes at least one of a horizontal view image and a vertical view image.

9. The method of claim 7, wherein the single image is a full angle view of the plurality of areas.

10. The method of claim 7, wherein the single image is a panorama view of the field of view.

11. A flexible electronic device, comprising:
    at least one sensor;
    a shape control actuator; and
    at least one processor configured to:
       control the at least one sensor to identify at least one event triggered in the flexible electronic device using the at least one sensor, and
       control the shape control actuator to change a shape of a surface of the flexible electronic device, according to the at least one identified event,
    wherein the changing of the shape of the surface of the flexible electronic device comprises changing, if the at least one event is associated with at least one camera, the shape of the flexible electronic device such that the at least one camera is positioned to at least one side of the flexible electronic device, according to the at least one event associated with the at least one camera.

12. The flexible electronic device of claim 11, wherein the at least one event is triggered by at least one of an external event and an internal event.

13. The flexible electronic device of claim 11, wherein the at least one processor is configured to control the shape control actuator to change the shape of the flexible electronic device according to the at least one identified event by:
    determining at least one shape of the flexible electronic device according to the at least one identified event; and
    controlling the shape control actuator to change the shape of the flexible electronic device according to the at least one determined shape.

14. The flexible electronic device of claim 13, wherein the shape control actuator is further configured to:
    apply an inflation strength to at least one actuator to change the shape of the flexible electronic device, wherein the at least one actuator causes a surface of the flexible electronic device to project according to the at least one determined shape.

15. The flexible electronic device of claim 14, wherein the shape control actuator is further configured to:

balance the projected surface by controlling a magnetic field strength of at least one electro magnet according to the at least one determined shape; and maintain the flexible electronic device in the at least one determined shape using the magnetic field strength.

16. The flexible electronic device of claim 13, wherein the at least one processor is further configured to:

determine whether the at least one event is associated with a camera event;

determine the at least one shape associated with the camera event; and change the shape of the flexible electronic device according to the at least one determined shape, wherein the change in shape causes a plurality of cameras in the flexible electronic device to be positioned to at least one side of the flexible electronic device.

17. The flexible electronic device as in claim 16, wherein the at least one processor is further configured to:

capture a plurality of images in a field of view of the plurality of cameras at a time; and stitch the captured plurality of images to create a single image of a plurality of areas included in the plurality of images.

18. The flexible electronic device of claim 17, wherein the plurality of captured images include at least one of a horizontal view image and a vertical view image.

19. The flexible electronic device of claim 17, wherein the single image is a full angle view of the plurality of areas.

20. The flexible electronic device of claim 17, wherein the single image is a panorama view of the field of view.

* * * * *